(12) United States Patent
Lorgeoux et al.

(10) Patent No.: US 12,713,463 B2
(45) Date of Patent: Aug. 18, 2026

(54) METHOD AND APPARATUS FOR SIMULTANEOUS MULTI-USER AND DIRECT LINK TRANSMISSIONS WITH REDUCED INTERFERENCES

(71) Applicant: CANON KABUSHIKI KAISHA, Tokyo (JP)

(72) Inventors: Mickael Lorgeoux, Rennes (FR); Stéphane Baron, Le Rheu (FR); François Thoumy, Le Tertre (FR); Brice Le Houerou, Acigne (FR)

(73) Assignee: Canon Kabushiki Kaisha, Tokyo (JP)

( * ) Notice: Subject to any disclaimer, the term of this patent is extended or adjusted under 35 U.S.C. 154(b) by 537 days.

(21) Appl. No.: 18/255,842

(22) PCT Filed: Nov. 30, 2021

(86) PCT No.: PCT/EP2021/083567
§ 371 (c)(1),
(2) Date: Jun. 2, 2023

(87) PCT Pub. No.: WO2022/117562
PCT Pub. Date: Jun. 9, 2022

(65) Prior Publication Data
US 2024/0114551 A1 Apr. 4, 2024

(30) Foreign Application Priority Data
Dec. 4, 2020 (GB) .................................... 2019186

(51) Int. Cl.
*H04W 74/0816* (2024.01)
*H04L 1/00* (2006.01)
(Continued)

(52) U.S. Cl.
CPC ....... *H04W 74/0816* (2013.01); *H04L 1/0003* (2013.01); *H04L 5/0053* (2013.01); *H04W 74/0866* (2013.01)

(58) Field of Classification Search
CPC .............. H04L 1/0003; H04L 5/0053; H04W 74/0816; H04W 74/0866
See application file for complete search history.

(56) References Cited

U.S. PATENT DOCUMENTS

2011/0106952 A1* 5/2011 Doppler ................ H04W 72/20 709/226
2017/0150493 A1 5/2017 Seok
(Continued)

FOREIGN PATENT DOCUMENTS

CN 108141876 A 6/2018
CN 110547026 A 12/2019
(Continued)

OTHER PUBLICATIONS

Robert Stacey (Intel); HE Frame Exchange Sequences; IEEE Draft; IEEE 802.11-17/0814r1; May 2017; Retrieved from the Internet: URL:https://mentor.ieee.org/802.11/dcn/17/11-17-0814-01-00ax-he-frame-exchange-sequences.pptx; Retrieved on May 10, 2017; pp. 1-34.
Yang Annan et al., Group-Based Uplink OFDMA Random Access Algorithm for Next-Generation WLANs, Feb. 2020, vol. 38 No. 1, Xi'am 710072, China, School of Electronics and Information, Northwestern Pyrotechnical University, English abstract on 7th page.

*Primary Examiner* — James P Duffy
(74) *Attorney, Agent, or Firm* — Canon U.S.A., Inc. IP Division

(57) ABSTRACT

A triggering frame in a wireless network grants a medium to an AP for a TXOP. The frame defines RUs and allocates Uplink RUs to UL transmissions for an UL duration and Direct Link RUs to P2P transmissions. All the P2P exchanges are nested within the UL duration, hence avoiding an acknowledgment frame in the DiL RUs to interfere with a block-ack frame of the AP after the UL transmissions.
(Continued)

This is relevant for DiL RUs adjacent, in frequency, to the other defined RUs. The block-ack frame is duplicated over the DiL RUs. The RU immediately adjacent to the DiL RUs is declared, in the triggering frame, as being unused: no non-AP station is allowed to use it during the UL duration, or even the TXOP. Such empty RU may be declared only in case the DiL transmission requires a response frame from the destination P2P station.

9 Claims, 9 Drawing Sheets

(51) Int. Cl.
*H04L 5/00* (2006.01)
*H04W 74/08* (2024.01)

(56) References Cited

U.S. PATENT DOCUMENTS

| | | | | |
|---|---|---|---|---|
| 2017/0332385 | A1 | 11/2017 | Shirali | |
| 2019/0306920 | A1 | 10/2019 | Son | |
| 2021/0144239 | A1* | 5/2021 | Barton | H04L 12/40189 |
| 2023/0354377 | A1* | 11/2023 | Yang | H04W 28/0278 |

FOREIGN PATENT DOCUMENTS

| | | | |
|---|---|---|---|
| WO | 2016089059 | A1 | 6/2016 |
| WO | 2020011677 | A1 | 1/2020 |
| WO | 2020011684 | A1 | 1/2020 |

* cited by examiner

440
TXOP
450
UL Length
421
431
Operating band = 40 MHz
Primary 20 MHz
RU1
461
TF or HE MU PPDU/ TRS
P2P PPDU 1→2
ACK 2→1
Multi STA BA (Duplic.)
Secondary 20 MHz
RU2
460
RU3
470
TF or HE MU PPDU/ TRS
TB PPDU STA3
TB PPDU STA4
Multi STA BA
410
SIFS
420
SIFS
SIFS
430

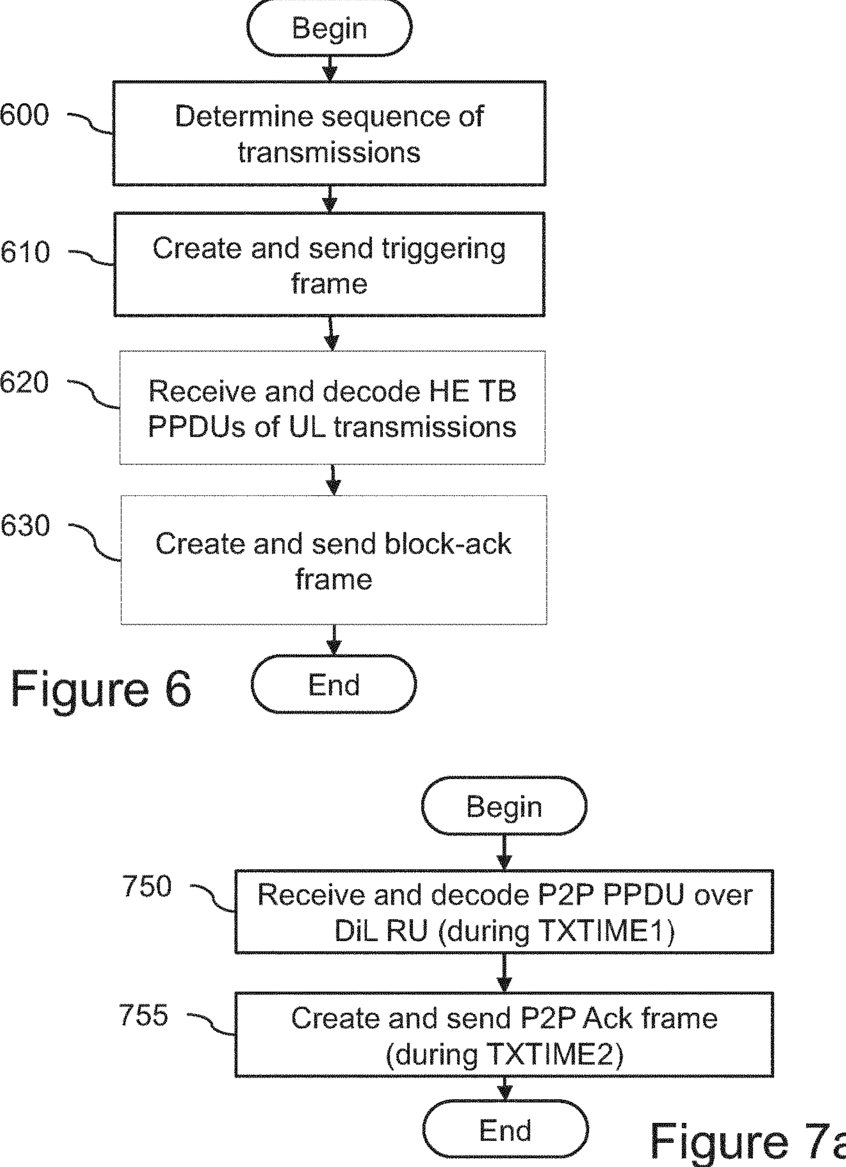
Figure 6
Figure 7a
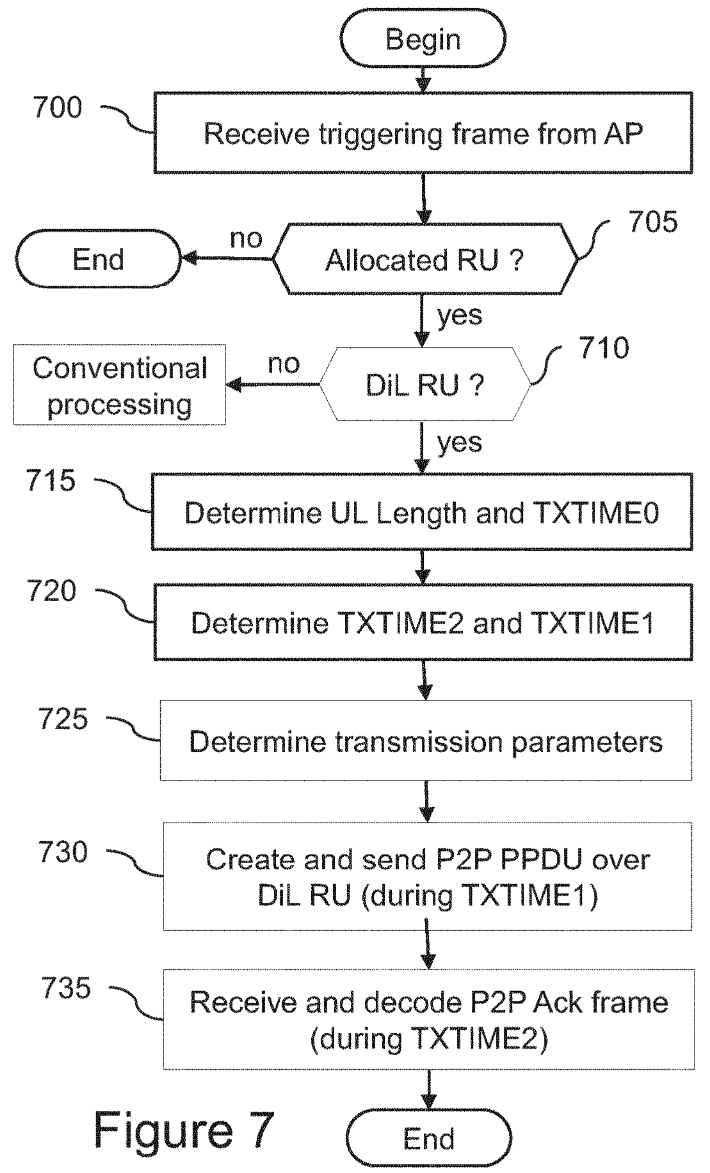
Figure 7

METHOD AND APPARATUS FOR SIMULTANEOUS MULTI-USER AND DIRECT LINK TRANSMISSIONS WITH REDUCED INTERFERENCES

CROSS-REFERENCE TO RELATED APPLICATIONS

This application the National Phase application of PCT Application No. PCT/EP2021/083567, filed on Nov. 30, 2021 and titled "METHOD AND APPARATUS FOR SIMULTANEOUS MULTI-USER AND DIRECT LINK TRANSMISSIONS WITH REDUCED INTERFERENCES". This application claims the benefit under 35 U.S.C. § 119(a)-(d) of United Kingdom Patent Application No. 2019186.2, filed on Dec. 4, 2020 and entitled "METHOD AND APPARATUS FOR SIMULTANEOUS MULTI-USER AND DIRECT LINK TRANSMISSIONS WITH REDUCED INTERFERENCES". The above cited patent applications are incorporated herein by reference in their entireties.

FIELD OF THE INVENTION

The present invention generally relates to wireless communications.

BACKGROUND OF THE INVENTION

Wireless communication networks are widely deployed to provide various communication services such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

In order to address the issue of increasing bandwidth and decreasing latency requirements that are demanded for wireless communications systems in high-density environments, multi-user (MU) schemes are being developed to allow a single access point (AP) to schedule MU transmissions, i.e. multiple simultaneous transmissions to or from non-AP stations, in the wireless network. For example, one of such MU schemes has been adopted by the Institute of Electrical and Electronics Engineers (IEEE) in the 802.11ax standard, draft version 7.0 (D7.0) of November 2020.

Thanks to the MU feature, a station has the opportunity to gain access to the wireless medium via two access schemes: the MU scheme and the conventional Enhanced Distributed Channel Access—EDCA (Single User) scheme.

The IEEE (registered trademark) 802.11ax standard allows a MU downlink (DL) transmission to be performed by the AP where the latter can perform multiple simultaneous elementary transmissions, over so-called resource units (RUs), to various non-AP stations. As an example, the resource units split a communication channel of the wireless network in the frequency domain, based for instance on Orthogonal Frequency Division Multiple Access (OFDMA) technique. The assignment or allocation of the RUs to the stations is signaled at the beginning of the MU Downlink frame, by providing an association identifier (AID) of a non-AP station (a 16-bit Association Identifier, AID, individually obtained by each station during its association procedure with the AP) for each RU defined in the transmission opportunity.

The 802.11ax standard also allows a MU uplink (UL) transmission to be triggered by the AP, where various non-AP stations can simultaneously transmit to the AP over the resource units forming the MU UL transmission. To control the MU UL transmission by the non-AP stations, the AP sends a control frame, known as a Trigger Frame (TF), by which it allocates the resource units to the non-AP stations using the 16-bit Association IDentifiers (AIDs) assigned to them upon registration to the AP and/or using reserved AIDs designating a group of non-AP stations. As multiple non-AP stations simultaneously transmit during the MU UL transmission, an appropriate synchronization is required to take full benefit of the orthogonality of the OFDM symbols.

The 802.11ax requirements in terms of synchronization mandate:

- that the participating non-AP stations start their transmission of the UL signal after a specified time interval SIFS (short interframe space) of 16 μs±400 ns after the end of the trigger frame. This is a timing compensation; and
- that the participating non-AP stations pre-compensate for carrier frequency offset (CFO) error, based on the trigger frame, in such a way a residual CFO error after compensation remains less than 350 Hz from a nominal transmit center frequency used by the AP.

These CFO and symbol clock error compensation with respect to the trigger frame guarantee that the simultaneous transmissions of the non-AP stations are synchronized in time and are orthogonal (orthogonality is kept between the resource units used by the various non-AP stations), thus allowing the AP to correctly receive and decode the OFDMA symbols and frames.

The adopted 802.11ax MU transmission scheme is not adapted to bandwidth-demanding communication services, e.g. video-based services such as gaming, virtual reality, streaming applications between non-AP stations. This is because all the communications go through the AP, thereby doubling the air time for transmission between the non-AP stations but also doubling the number of medium accesses, hence the medium access time.

The Single User (SU) scheme of 802.11 network protocol allows a direct link (DiL, also called peer-to-peer (P2P) transmission) between two non-AP stations to be performed without involving the AP, wherein the data (MAC) frames are addressed using the 48-bit IEEE MAC address of the destination non-AP station.

However, SU and MU schemes directly compete one against the other to gain access to the wireless medium (by the AP for MU schemes, by a non-AP station for the SU scheme). In high density environments, this competition generates a large amount of undesirable collisions, thereby degrading latency and overall useful data throughput.

Recent discussions within the IEEE 802.11be draft standard Task Group contemplate integrating DiL transmissions under the global policy of the AP's scheduling, hence allowing MU UL transmissions and P2P transmissions to be triggered simultaneously by the AP, for instance on adjacent channels. The drawbacks of the above competition between SU and MU schemes therefore drastically reduce: an improvement of spectrum efficiency, latency and overall useful data throughput is obtained.

However, the simultaneous MU UL and P2P transmissions from multiple (e.g. non-AP) stations on adjacent channels face interference issues, in particular with respect to the orthogonality of the signals simultaneously transmitted by the multiple stations.

It is thus desirable to design more efficient mechanisms to allow simultaneous MU UL and P2P transmissions on adjacent channels that limit, reduce, and even avoid, channel interferences.

SUMMARY OF INVENTION

It is a broad objective of the present invention to overcome some of the foregoing concerns.

In this context, the invention provides a communication method in a wireless network comprising, at a first peer-to-peer, P2P, station, STA:

receiving, from an access point, AP, a triggering frame reserving a transmission opportunity, TXOP, the triggering frame allocating one direct link, DiL, resource unit, RU, to the first P2P STA for DiL communication and allocating one or more uplink, UL, RUs for UL communication during a specified UL duration, and during the specified UL duration, transmitting, to a second P2P STA, a first frame over a first part of the allocated DiL RU; and receiving a second frame from the second P2P STA over a second part of the DiL RU.

The DiL or P2P transmission is thus designed to be nested within the UL duration only, i.e. during the period provided to some non-AP stations to transmit their uplink frames to the AP. This ensures the P2P transmission, in particular the acknowledgments of the second P2P STA, does not occur simultaneously to the (multi-station block) acknowledgment frame or frames of the AP to acknowledge the UL frames. Channel interference between the acknowledgments, where the synchronization by the second P2P station is hard to obtain, is thus avoided, or at least reduced.

Correlatively, the invention also provides a wireless communication device comprising at least one microprocessor configured for carrying out the steps of any of the above method.

Optional features of embodiments of the invention are defined in the appended claims. Some of these features are explained here below with reference to a method, while they can be transposed into device features.

In some embodiments, the allocated DiL RU is an n*20 MHz channel, with n a positive integer. This is to ease management of the DiL RUs. It turns out that the DiL RU may be adjacent to another 20 MHz channel in which the UL transmission occurs. Indeed, the one or more UL RUs may belong to a set of RUs defined, in the triggering frame, to be adjacent, in frequency, to the DiL RU.

In some embodiments, the method at the first P2P STA further comprises sensing an acknowledgment, ACK, frame sent by the AP on the DiL RU, after the specified UL duration (and usually a SIFS after), for instance for the time remaining after the UL duration given the TXOP. The ACK frame may be a block acknowledgment (BA) acknowledging the UL frames. In these embodiments, the AP simultaneously acknowledges received UL frames and protects the DiL RU from medium access by other stations. In that case, after the UL duration, none of the P2P stations thus transmits frame over the DiL RU.

In this context, the present invention also provides a communication method in a wireless network comprising, at an access point, AP:

transmitting a triggering frame reserving a transmission opportunity, TXOP, the triggering frame allocating one direct link, DiL, resource unit, RU, to a first peer-to-peer, P2P, station, STA for DiL communication and allocating one or more uplink, UL, RUs for UL communication during a specified UL duration, receiving physical protocol data units, PPDUs, over the UL RU or RUs during the specified UL duration, and transmitting, after the specified UL duration (e.g. a SIFS after), an acknowledgement, ACK, frame over a frequency band that encompasses the DiL RU.

In variants, the first P2P station may transmit energy over the DiL RU after the UL duration for a time remaining after the UL duration given the TXOP. In particular, the energy may be transmitted over the DiL RU except guard tones adjacent in frequency to other RUs defined in the triggering frame (e.g. RUs adjacent to the DiL RU). The guard tones belong to the DiL RU, meaning the energy is transmitted over a bandwidth shorter than the DiL RU as declared in the triggering frame. This aims at protecting the DiL RU from medium access by other stations while avoiding channel interference with any acknowledgment sent by the AP with respect to the UL transmission. The energy may not form an intelligible frame for the second P2P station. In other variants, any other station may transmit such energy over the DiL RU, with or without the guard tones, to protect the DiL RU from legacy medium access.

In some embodiments, the first frame is transmitted with a pre-corrected transmit center frequency, e.g. within a ±350 Hz window, from a nominal transmit center frequency used by the AP to transmit the triggering frame, and may be transmitted within a SIFS±0.4 μs period from an end of the triggering frame. A carrier frequency offset and timing compensation is thus performed by the first P2P station given the triggering frame. This ensures orthogonality of the P2P transmission with the UL transmission within the adjacent UL RU or RUs is kept.

In some embodiments, one RUs that is immediately adjacent in frequency to the DiL RU is defined in the triggering frame to remain empty during the UL duration. In other words, no UL transmission is scheduled for this RU by the AP. This RU is preferably a subpart of a 20 MHz channel, so that energy (through UL transmission) will be transmitted over the 20 MHz channel, avoiding stations to access the medium over this 20 MHz channel. Of course, the whole adjacent 20 MHz channel may be let empty.

This approach drastically reduces risks of channel interference between the UL transmissions and the second frame sent by the second P2P station without precise synchronization with the AP, hence with the UL non-AP stations.

In this context, the present invention also provides a communication method in a wireless network comprising, at an access point, AP:

transmitting a triggering frame reserving a transmission opportunity, TXOP, the triggering frame allocating one direct link, DiL, resource unit, RU, to a first peer-to-peer, P2P, station, STA for DiL communication and allocating one or more uplink, UL, RUs for UL communication during a specified UL duration, wherein one RU immediately adjacent in frequency to the DiL RU is defined in the triggering frame to remain empty during the UL duration, and receiving physical protocol data units, PPDUs, over the UL RU or RUs during the specified UL duration.

In some embodiments, the method further comprises at the AP:

obtaining, from the first P2P station, an acknowledgment policy relating to the DiL communication, and deciding, based on the obtained acknowledgment policy, whether to define the immediately frequency-adjacent RU to remain or not empty during the UL duration. Indeed, risks of channel interference exist during the UL duration for the frames sent by a second P2P station during the DiL sessions, e.g. for acknowledgment frames. Therefore, should no acknowledgment be expected, the frequency-adjacent RU may be used, hence improving network efficiency.

In some embodiments, an allocation subfield (e.g. so called AID12 subfield) associated with the immediately frequency-adjacent RU in the triggering frame is set to one from a null identifier. It means, the RU is not assigned or allocated, a station identifier (AID) corresponding to an unknown station, and a predefined reserved station identifier, that does not allocate the RU to any station or group of stations.

Such signaling guarantees that no station will transmit over this "empty" RU during the UL duration, hence reducing risks of channel interference with the DiL RU.

In some embodiments, the immediately frequency-adjacent RU is 26 or 52-tones width. With this RU width, risks of channel interference between the UL transmission and the second frame are highly reduced.

In some embodiments, the immediately frequency-adjacent RU is at a boundary of a 20 MHz channel adjacent in frequency to another 20 MHz channel to which the DiL RU belongs. Indeed, the DiL RU is preferably a multiple of 20 MHz (including 20 MHz only) to ease DiL management. Adjacency (in frequency) of 20 MHz channels may include some guard tones therebetween.

Preferred implementation is when the first part and the second part are time-multiplexed and separated by a short interframe space, SIFS.

In this way, the transmission of the second frame, occupying the second part of the allocated DiL RU, starts just after a SIFS from the end of the transmission of the first frame, occupying the first part, prevents from having the medium preempted by a transmission from another STA not having its NAV set, after the end of the transmission of the first frame.

In particular, the transmitting of the first frame is configured such that an end of transmission of the second frame by the second P2P STA aligns in time with an end of the specified UL duration.

This allows the AP to resume control over the medium after the end of the allocated DiL RU without interference with other stations. In fact, if the transmission of the second frame ends before the time allocated by the AP for the peer-to-peer communication has elapsed, a station that has not set its NAV may preempt the medium and starts transmitting.

In one implementation, the second frame is a response frame to the first frame.

For example, the second frame is an acknowledgement, ACK, frame sent by the second P2P STA for acknowledging reception of the first frame.

According to embodiments, configuring the transmitting of the first frame comprises setting the length of the first frame such that the time remaining for the second part of the DiL RU (i.e. duration from one SIFS after the end of transmission of the first frame until the end of the specified UL duration) matches the transmission time of the second frame.

This causes the DiL communication to occupy the whole UL duration of the allocated DiL RU without a need for a specific signaling by the first P2P STA to the second STA. This may be implemented when a length of the second frame is known or predictable to the first P2P STA, such as a second frame embodying an immediate acknowledgement for acknowledging the first frame.

In one implementation, setting the length of the first frame comprises:

calculating a time TXTIME1 available for the first P2P STA to transmit a physical protocol data unit (PPDU) comprising the first frame based on a time of transmitting the second frame; and deriving a data length of the first frame (i.e. an amount of data) based on the obtained time TXTIME1 and at least one transmission parameter, such as a modulation and coding scheme, MCS, used for transmitting the first frame, wherein TXTIME1 is calculated as TXTIME0−TXTIME2−SIFS, where:

TXTIME0 is computed from the UL duration specified in the triggering frame, and

TXTIME2 is the time required to the second P2P STA to transmit a physical protocol data unit (PPDU) comprising the second frame.

According to embodiments, the triggering frame is a trigger frame received from the AP.

In one implementation, the triggering frame is a data or control frame received from the AP that includes a trigger resource scheduling (TRS) field.

In particular, the triggering frame indicates a location of the DiL RU within an operating frequency band.

Another aspect of the invention relates to a non-transitory computer-readable medium storing a program which, when executed by a microprocessor or computer system in a wireless device, causes the wireless device to perform any method as defined above.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which:

FIG. 6 illustrates, using a flowchart, general steps performed by an AP according to embodiments of the invention;

FIG. 7 illustrates, using a flowchart, general steps performed by a non-AP station receiving a triggering frame from the AP, according to embodiments of the invention;

FIG. 7a illustrates, using a flowchart, general steps performed by a destination P2P non-AP station according to embodiments of the invention;

DETAILED DESCRIPTION OF EMBODIMENTS

The present invention generally relates to wireless communications.

A triggering frame in a wireless network grants a medium to an Access Point for a TXOP. The triggering frame defines resource units, RUs. One or more are allocated for Uplink, UL, transmissions for an UL duration. One or more are Direct Link, DiL, resources units, RUs, for peer-to-peer, P2P, transmissions. The DiL RU or RUs are adjacent, in frequency, to some of the defined RUs. All the P2P exchanges are nested within the UL duration, hence avoiding an acknowledgment frame in the DiL RU to interfere with a block-ack frame transmitted by the AP after the UL transmissions. The block-ack frame is duplicated over the DiL RUs to prevent a third party from gaining access to the corresponding part of the medium before the end of the TXOP. At least the defined RU immediately frequency-adjacent to the DiL RUs is declared, in the triggering frame, as being unused: no non-AP station is allowed to use it during the UL duration, or even the TXOP. Such empty RU may be declared only in case the DiL transmission requires a response frame from the destination P2P station.

In the following description, each frame consists of a preamble part and a data payload part. Although the preamble part is not depicted in all the Figures, it is shown as a black portion at the beginning of each frame of the Figures from frequency perspective (i.e. FIGS. 2b, 2d, 4b, 5b). Each preamble is advantageously transmitted over the whole corresponding 20 MHz channel, while the data may be transmitted over a subpart thereof, typically an RU.

Figure 1:
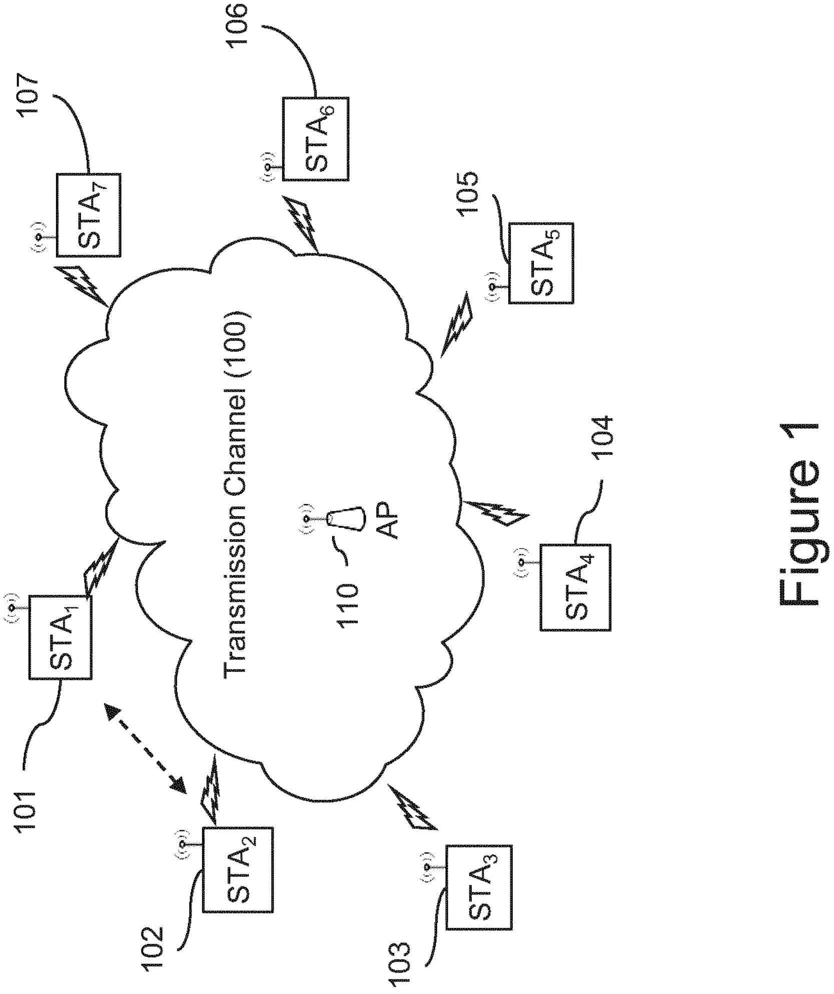
FIG. 1 illustrates a typical wireless communication system in which embodiments of the invention may be implemented.

FIG. 1 illustrates a wireless communication system in which several communication stations 101-107, 110 exchange data frames over a radio transmission channel 100 of a wireless local area network (WLAN). A central station, namely access point (AP) 110, 20 may manage a basic service set (BSS) of the wireless system. More than one BSS may be managed by an AP if it implements virtual APs. The radio transmission channel 100 is defined by an operating frequency band (OFB) constituted by a single channel or a plurality of channels forming a composite channel.

An exemplary situation of direct communications, corresponding to an increasing trend nowadays, is the presence of peer-to-peer (P2P) transmissions in between non-AP stations, e.g. STA 102 and STA 101 illustrated in the Figure. Technologies that support P2P transmissions are for example WiFi-Miracast® or Wireless Display scenario, or Tunneled Direct Link Setup (TDLS). Note that even if P2P flows are usually not numerous, the amount of data per flow may be huge (typically low-compressed video, from 1080p60 up to 8K UHD resolutions).

Each of STAs 101-107 may associate with AP 110 during an association procedure. During the association procedure, AP 110 assigns a specific Association IDentifier (AID) to the requesting STA. For example, the AID is a 16-bit value uniquely identifying the STA.

For P2P transmissions, both P2P non-AP stations are not necessarily registered within the AP's BSS. For example, P2P STA 101 may be registered within the BSS managed by AP 110 while P2P STA 102 is registered within the same BSS managed by AP 110. In a variant, P2P STA 102 may not yet be registered within the same BSS managed by AP 110.

The stations 101-107, 110 may compete one against each other using EDCA (Enhanced Distributed Channel Access) contention, to access the wireless medium in order to be granted a transmission opportunity (TXOP) and then transmit (single-user, SU) data frames.

The stations may also use a multi-user (MU) scheme in which a single station, usually AP 110, is allowed to schedule a MU transmission, i.e. allowing multiple simultaneous transmissions to or from other stations, in the wireless network. One implementation of such a MU scheme has been for example adopted in IEEE 802.11ax amendment standard, as the Multi-User Uplink and Downlink OFDMA (MU UL and DL OFDMA) procedures.

Figure 2A:
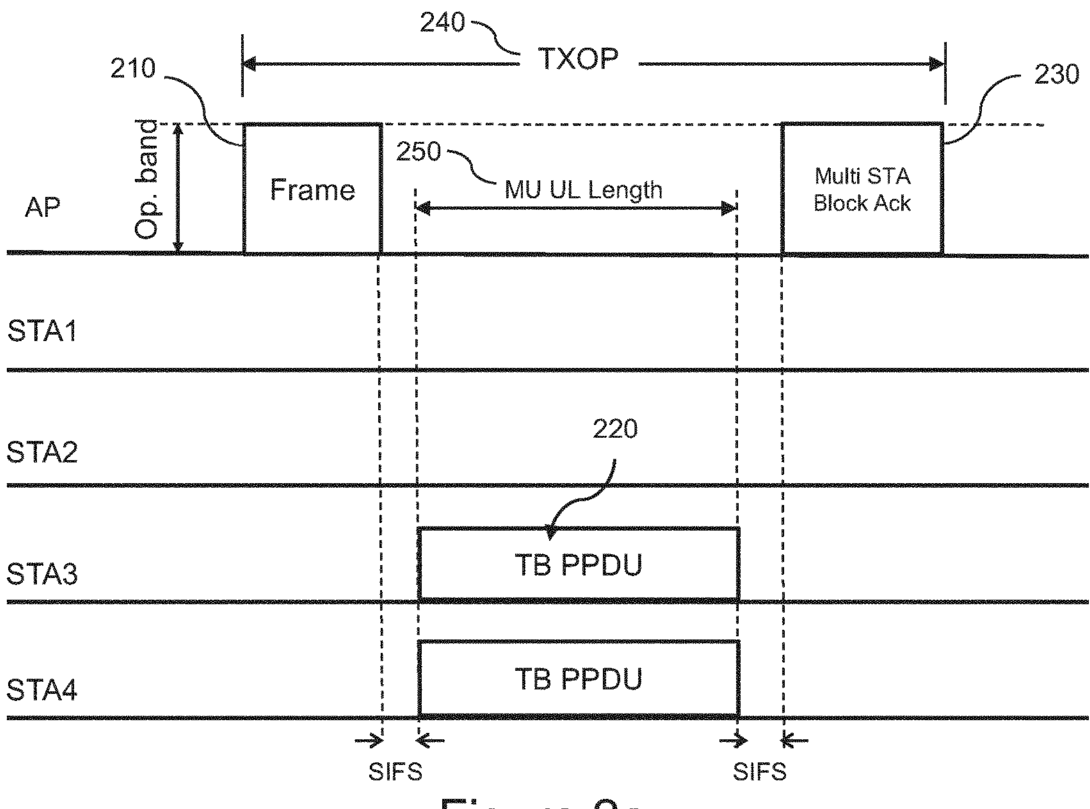
FIGS. 2a and 2b illustrate a conventional trigger-based (TB) MU UL OFDMA transmission with acknowledgment according to 802.11ax.
Figure 2B:
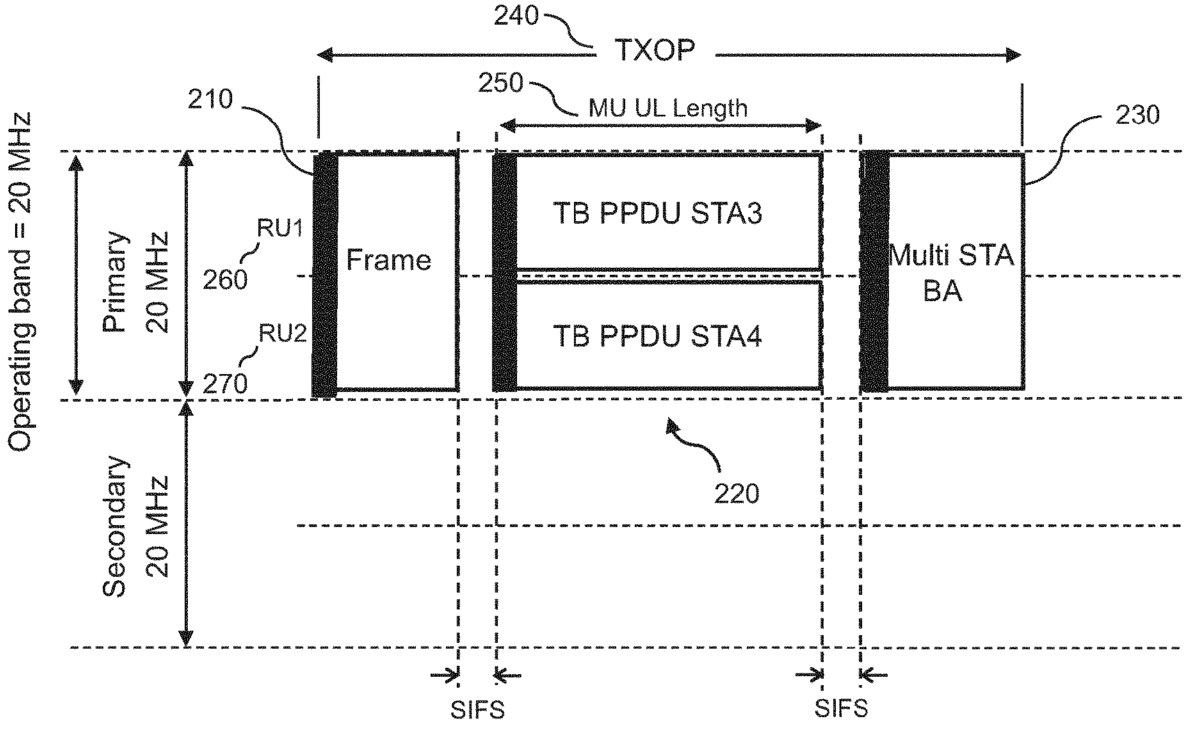

FIGS. 2a and 2b illustrate, respectively from station and operating frequency band perspectives, a conventional trigger-based (TB) MU UL OFDMA transmission with acknowledgment according to 802.11ax.

To perform such MU UL transmission, the 802.11ax standard splits a granted communication channel into resource units (RUs) that are shared in the frequency domain by the multiple stations based on Orthogonal Frequency Division Multiple Access (OFDMA) technique.

The OFDM technique is largely deployed in today wireless communication networks to improve the spectrum efficiency given the increasing number of users and throughput needs while the frequency resources remain limited. In OFDM, the use of orthogonal subcarriers allows a high number of closely spaced subcarriers to be defined in the available bandwidth, resulting in an increase of spectral efficiency.

The orthogonality is defined as being the subcarrier spacing where the peak in the spectrum amplitude of a given subcarrier is line up with the nulls of the adjacent subcarriers. As a result, each subcarrier can be decoded without interference from neighboring subcarriers.

As long as orthogonality is respected between the subcarriers within a same frequency channel and also between the subcarriers of adjacent channels within the operating frequency band, no interference issue will happen and the OFDM signal can be correctly decoded by a receiving station.

On the contrary, a lack of orthogonality will result in interferences between the subcarriers within the same frequency channel and also between the subcarriers of adjacent channels within the operating frequency band. When different stations are transmitting on adjacent RUs, a fine synchronization between the emitting stations has to be provided to ensure the orthogonality property.

The example of the Figure shows a granted operating frequency band made of a single 20 MHz channel, i.e. 242 frequency tones. MU UL OFDMA of course applies to wider granted operating frequency bands, for instance of 40 MHz, 80 MHz, 80+80 MHz and 160 MHz-width.

As shown in the Figures, to finely control the MU UL transmissions by the non-AP stations 103 (STA3) and 104 (STA4), AP 110 sends a so-called triggering frame 210 (as defined in 802.11ax) which reserves the operating frequency band for a duration known as transmission opportunity TXOP 240 and defines how the granted channel is split in frequency into RUs (herebelow UL RUs) and which non-AP station is allowed to transmit over each RU (i.e. to which non-AP station is allocated each RU).

The triggering frame is transmitted by AP 110 at a nominal frequency centered within the 20 MHz channel considered (here below referred to as "nominal transmit center frequency"). The nominal frequency of a station (here AP 110) is the frequency generated by its reference oscillator. If no correction is applied to the nominal frequency, it determines the nominal transmit center frequency of the station as well as its nominal symbol clock frequency.

The triggering frame is 20 MHz wide (preamble and data) and may be duplicated over several 20 MHz channels should the triggering frame defining RUs over these several 20 MHz channels.

The RUs may have various sizes, for instance as defined in Table 27-26 of the 802.11ax standard.

Triggering frame 210 further defines the UL duration 250 ("MU UL Length" on the FIG. 2*a*) during which the assigned non-AP stations can transmit UL frames.

Triggering frame 210 may either be a trigger frame or be a data or control frame including a trigger resource scheduling (TRS) subfield as defined in the 802.11 ax standard.

Figure 3A:
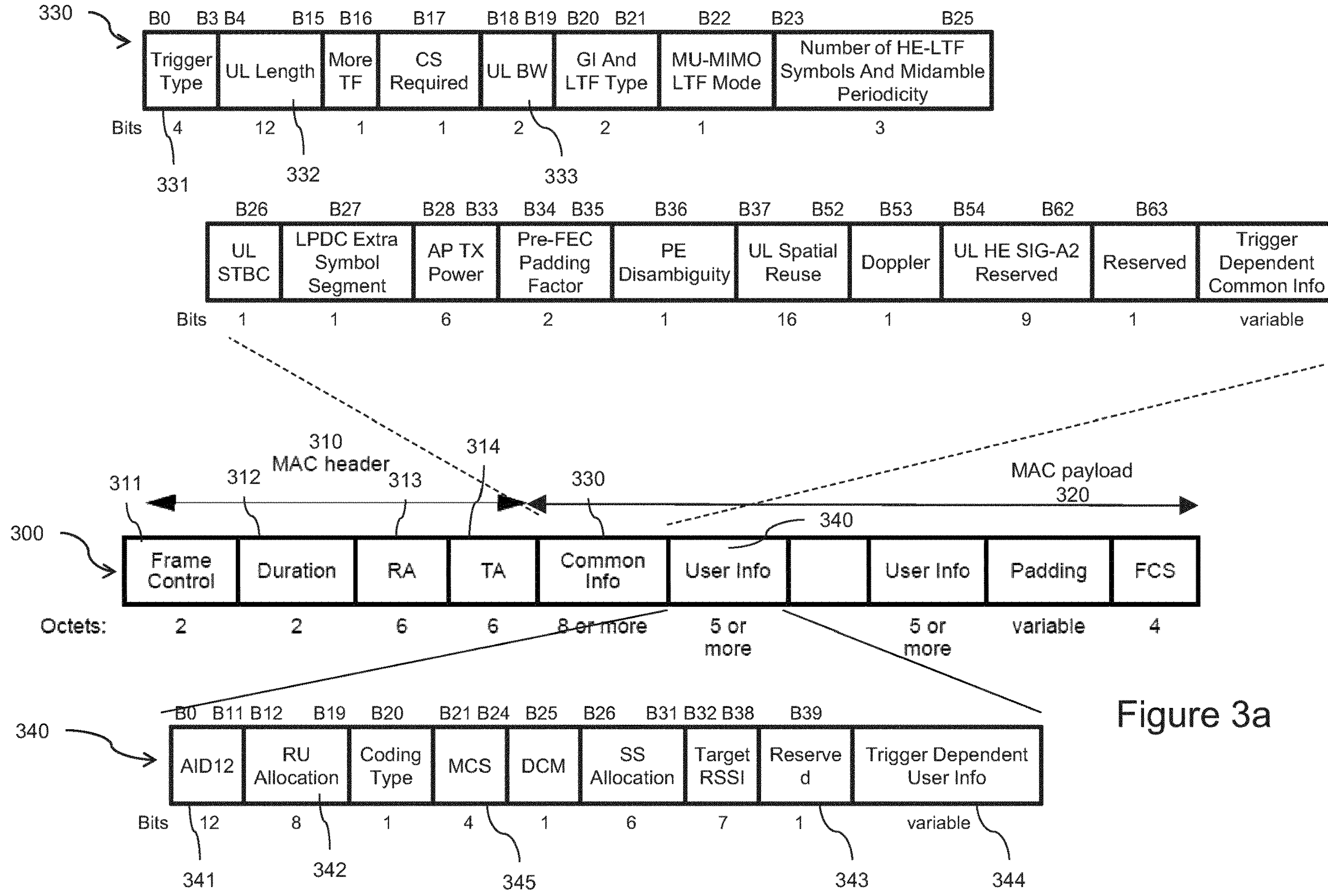
FIG. 3a illustrates the format of a trigger frame as described in the 802.11ax standard to perform MU UL OFDMA transmissions.

FIG. 3*a* illustrates the format of a trigger frame as described in the 802.11ax standard to perform MU UL OFDMA transmissions.

It is a MAC (standing for Medium Access Control) frame 300 made of:

- a MAC header 310 with a standardized "Frame Control" field 311, a standardized "Duration" field 312 defining the duration of TXOP 240, an "RA" field 313 set to a broadcast MAC address, and a "TA" field set to a MAC address 314 of the AP transmitting the trigger frame, and
- a MAC payload 320.

The MAC payload 320 includes:

- a single "Common Info" field 330,
- one or more "User Info" fields 340, and
- padding and FCS fields.

The "Common Info" field 330 comprises a "Trigger Type" subfield 331 which specifies the type of the trigger frame. For instance, a basic TF is signaled by a value 0 in the "Trigger Type" subfield 331.

The "Common Info" field 330 also comprises a "UL Length" field 332 specifying the duration of the solicited UL transmission "MU UL Length" 250, and a 2-bit "UL BW" field 333 specifying the bandwidth of the operating frequency band considered, e.g. BW=0 to define a 20 MHz bandwidth, BW=1 for a 40 MHz bandwidth, BW=2 for an 80 MHz bandwidth, BW=3 for an 80+80 MHz or 160 MHz bandwidth.

Each "User Info" field 340 corresponds to one of the RUs defined by TF 300. Any order of the "User Info" fields 340 can be used within TF 300 because these fields are self-sufficient to define the RUs and their access schemes.

A "User Info" field 340 includes an "AID12" subfield 341, an "RU Allocation" subfield 342 and ends with a reserved B39 bit 343 and a "Trigger Dependent User Info" subfield 344 of variable length, the content of which provide details on communication parameters and depends on the "Trigger Type" subfield 320. Other fields exist that are not explained herewith for concision.

The "AID12" subfield 341 is set to the AID (12 LSBs of the AID) of the non-AP station to which the RU defined in "RU Allocation" subfield 342 is allocated in case of scheduled access or is set to AID=0 or 2045 to offer the corresponding RU to random access to respectively associated and unassociated non-AP stations. The 802.11ax standard (Table 9-31i of version D7.0 of the standard for instance) defines the values to be used in "RU Allocation" subfield 342 to designate a specific RU within the operating frequency band signaled in "UL BW" field 333.

As mentioned above, a variant to a trigger frame is a data or control frame including a trigger resource scheduling (TRS) subfield as defined in the 802.11ax standard. The TRS control subfield may be added in the A-Control field of each HE PPDU sent by the AP to the non-AP stations (i.e. it is added in addition to data themselves). As the data or control frame is intended for a specific non-AP station, the latter knowns (without the need of an AID12 subfield) that the TRS subfield is addressed to it. Preferably, the data or control frames for various non-AP stations are sent by the AP using the MU DL scheme, in such a way the non-AP stations simultaneously receive their frame.

Figure 3B:
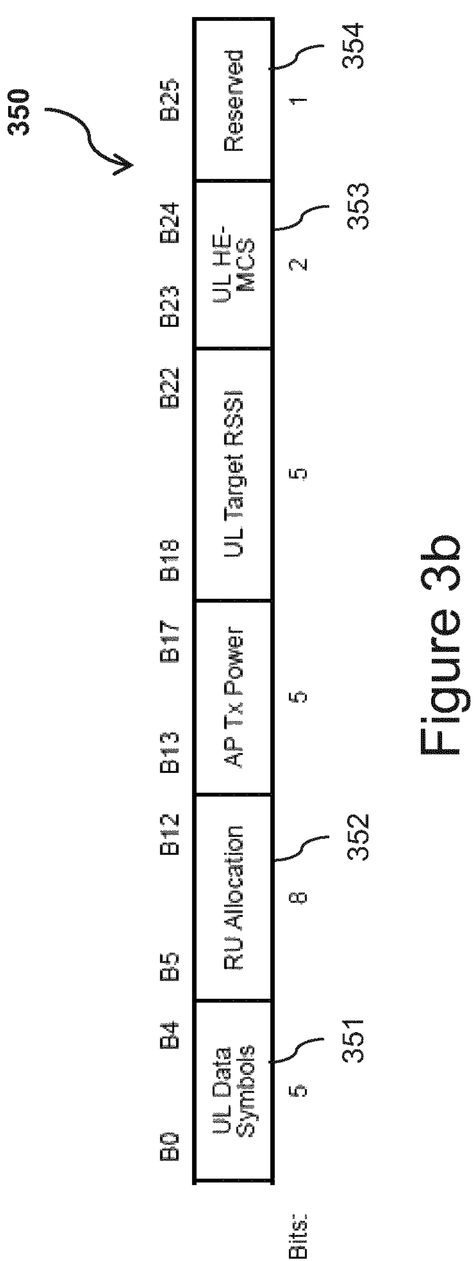
FIG. 3b illustrates the format of TRS subfield as described in the 802.11ax standard to perform MU UL OFDMA transmissions.

The TRS subfield is illustrated in FIG. 3*b*; it contains all indications needed by an addressed non-AP station to identify its allocated UL RU and then transmit a HE TB PPDU 220 in the next MU UL transmission 250, without having to EDCA-access the medium. The MU UL transmission 250 is for instance triggered a SIFS (Short Inter Frame Space) after the reception of the HE PPDU comprising the TRS subfield from the AP.

As shown in FIG. 3*b*, TRS subfield 350 according to 802.11ax includes an UL Data Symbols subfield 351 and a RU allocation subfield 352 defining the UL RU to be used to transmit a HE TB PPDU 220 in the next MU UL transmission. The UL Data Symbols subfield indicates the number of OFDM symbols in the Data field of the HE TB PPDU 220 and is set to the number of OFDM symbols minus 1. The other parameters of TRS subfield 350 are used to indicate the modulation (MCS) 353 and transmission power (based on the expected RSSI at AP side) to be used for the AP. Bit B25 (354) is currently not used.

In the example shown in FIGS. 2*a* and 2*b*, triggering frame 210 assigns or allocates UL RU 260 to STA3 and UL RU 270 to STA4. The allocation is made using the AIDs of the non-AP stations.

Upon receiving triggering frame 210, each non-AP station determines whether it is assigned/allocated one UL RU, thanks to its own AID. Next, each non-AP station to which an UL RU is allocated can start transmitting MU UL frames 220 (known as HE TB PPDU) over its allocated UL RU towards the AP after triggering frame 210. Due to the triggering mechanism, the terms "trigger-based MU UL transmission" are used.

To keep orthogonality between the signals transmitted by the assigned non-AP stations during the UL duration 250, the latter perform carrier frequency offset and timing compensations. This ensures synchronization between them. As specified in the 802.11ax standard for the transmission of HE TB PPDUs 220, the assigned non-AP stations must transmit with a residual CFO error within a ±350 Hz window from the nominal transmit center frequency used by the AP when transmitting the triggering frame and the transmission start time must remain within a SIFS±0.4 μs window from the end of triggering frame 210.

In such a case where a pre-correction of the frequency is applied, the pre-correction enables to get a transmit center frequency and a symbol clock frequency close to the nominal transmit center frequency and nominal symbol clock frequency of the station used as reference for the pre-correction computation (for instance, ±350 Hz from AP's nominal transmit center frequency for the transmission of HE TB PPDUs).

Figure 3C:
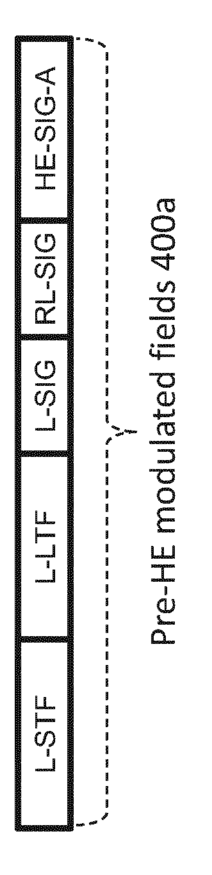
FIG. 3c illustrates the starting portion or preamble of HE PPDUs.

To do compensations, any station has to compute pre-correction parameters. This is made based on the preamble of a frame received. FIG. 3*c* illustrates the beginning of each frame (pre-HE modulated preamble portion), whatever its format: HE SU PPDU, HE MU PPDU (which includes one additional field in the pre-HE modulated preamble portion) and HE TB PPDU.

The station uses the preamble parts L-STF, L-LTF of the frame received (triggering frame from the AP in the example above) to detect the packet, to tune the automatic gain control, to estimate the frequency offset and the time synchronization. This leads to the determination of the pre-correction parameters.

The station then applies the pre-correction parameters in particular to align the transmit center frequency of the station to the nominal transmit center frequency used by the AP to transmit the frame. The nominal transmit center frequency is typically the central frequency of the 20 MHz channel, that makes it possible to center the preamble of the simultaneous UL transmissions.

In the example shown, STA3 transmits its HE TB PPDU 220 over UL RU 260 and STA4 transmits its HE TB PPDU 220 over UL RU 270. They use a pre-correction of their nominal transmit center frequency with respect to triggering frame 210 received from AP 110. It is to be noted that STA3 and STA4 starts emitting the same preamble (block portion on the Figure) over the entire 20 MHz channel (which preambles thus superimpose one on each other) before transmitting the data over their allocated UL RU only.

Thanks to these pre-corrections, the parallel transmissions of STA3 and STA4 are synchronized in time, and the orthogonality is kept between their respective UL RUs 260 and 270. As a result, no interference issue happen during the parallel transmission of the two HE TB PPDUs by STA3 and STA4 and AP 110 is then able to decode correctly the received MU frames 220.

After the parallel transmission of the two HE TB PPDUs 220 by STA3 and STA4 (a SIFS after), AP 110 sends a multi-station (M-STA) block ack (BA) frame 230 to acknowledge the reception of the HE TB PPDUs 220.

AP 110 transmits triggering frame 210 and the multi-station block ack frame 230 on the overall operating frequency band, i.e. 20 MHz in this example, based on the nominal transmit center frequency of its internal reference clock. As specify in the 802.11ax standard, the tolerance on this nominal transmit center frequency is ±20 ppm (parts-per-million) in the 5 GHz and 6 GHz bands.

Figure 2C:
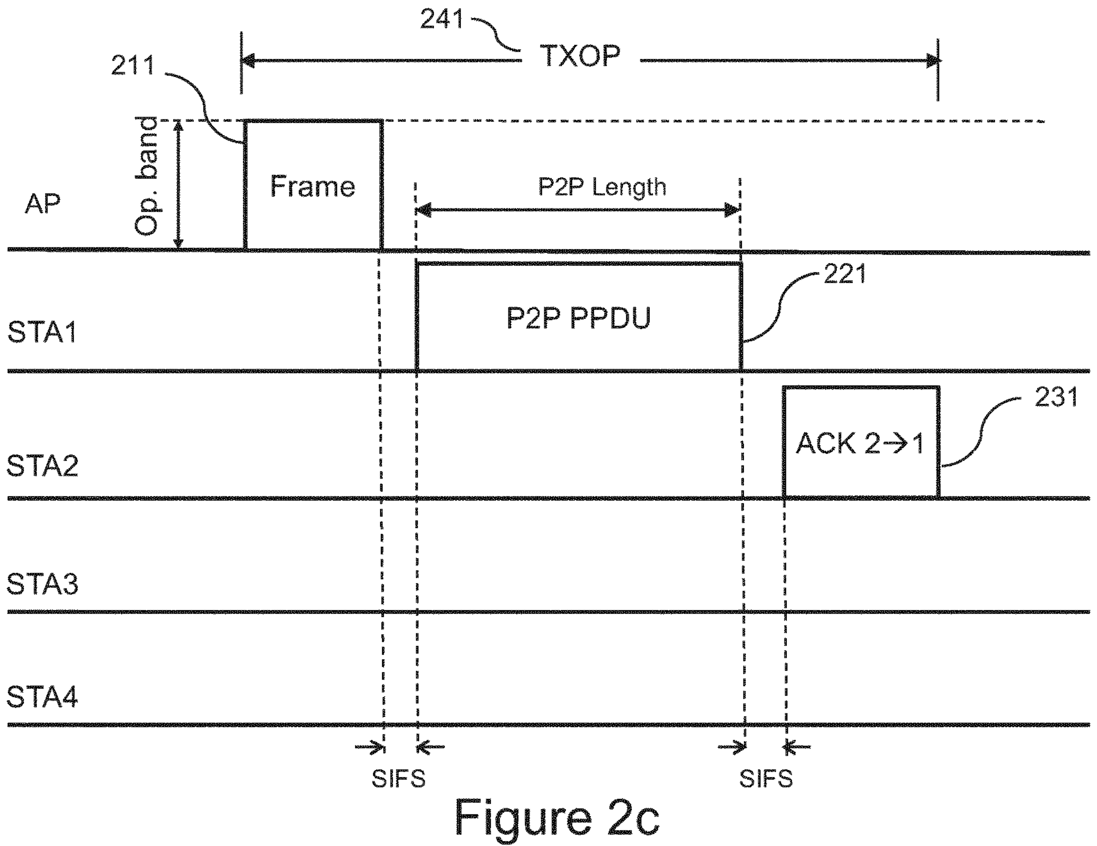
FIGS. 2c and 2d illustrate a trigger-base (TB) P2P transmission with acknowledgment during a transmission opportunity (TXOP) according to discussions relating to a future evolution of 802.11 standard.
Figure 2D:
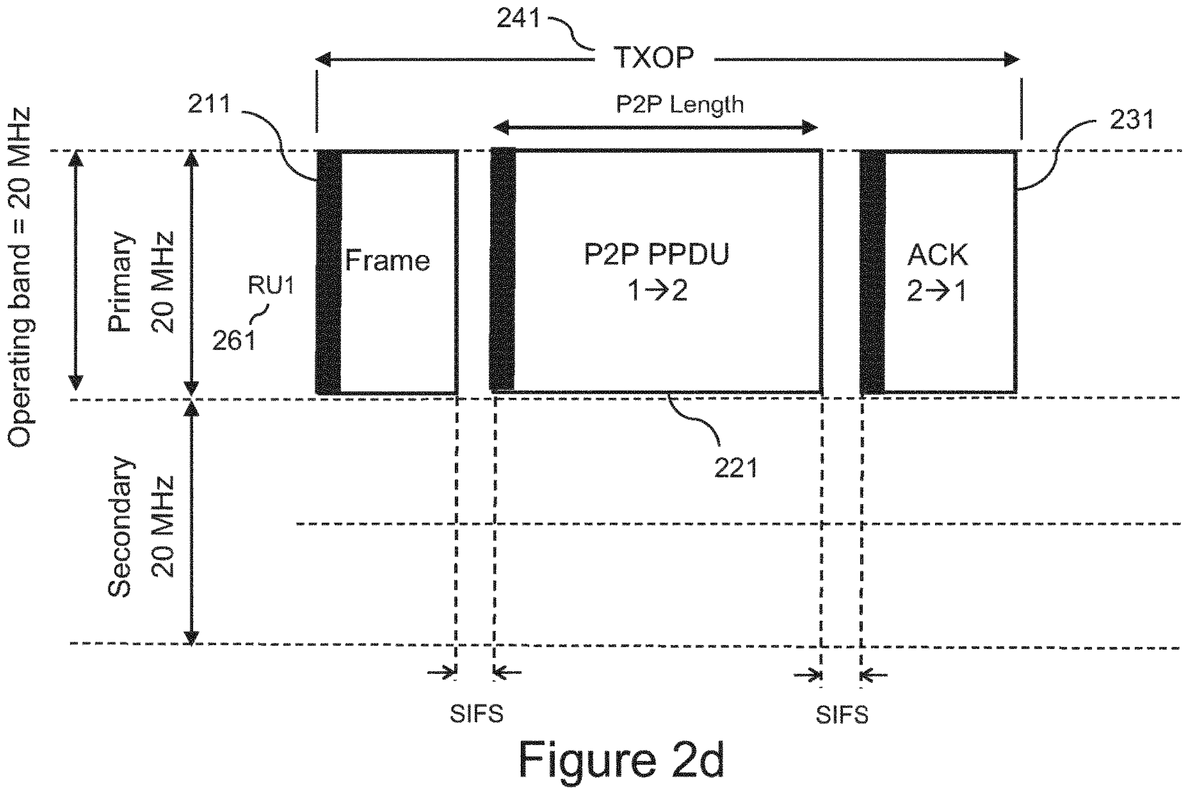

FIGS. 2*c* and 2*d* illustrate, respectively from stations and operating frequency band perspectives, a trigger-based (TB) P2P transmission with acknowledgment as contemplated in the works of the IEEE 802.11 be draft standard Task Group.

In order to further address the issue of increasing bandwidth and decreasing latency requirements that are demanded for wireless communications systems in high-density environments, some proposals within the 802.11be working group seek to efficiently vary the transmissions allowed in a triggered MU transmission.

In this context, some proposals provide features allowing Direct Link (DiL), also referred to as peer-to-peer (P2P), transmissions to be scheduled in a MU transmission and efficiently managed. The management is seen to be distributed between the AP that allocates a 20 MHz resource unit for DiL transmission and a first (source) P2P station (registered to the AP) that controls P2P transmission over the DiL RU with a second (destination) P2P station. For instance, the first P2P station uses the DiL RU to transmit P2P data and subleases part of the allocated bandwidth to the second P2P station for response frame transmission.

The allocation of the DiL RU is performed by a triggering frame, either a trigger frame or a data or control frame including a trigger resource scheduling (TRS) subfield as defined in the 802.11ax standard.

To that end, the triggering frame sent by the AP is enhanced to allocate an RU of the MU transmission to DiL. As a result, the triggering frame offers Direct Link (DiL) transmission capabilities within the MU scheme, in addition to conventional MU Downlink (DL) and Uplink (UL) capabilities.

As will be described in more detail here below, the first P2P station that has been allocated a DiL RU by the AP may perform time sharing of the DiL RU with the second P2P station. Both P2P stations may thus exchange data in a peer-to-peer scheme using the DiL RU.

The first P2P station uses the P2P capability offered during the triggered MU transmission to send a P2P data frame. Also, the second P2P station may then receive the P2P data frame over the DiL RU allocated and responds with a P2P response frame towards the first P2P station, still over the DiL RU.

In the present document, "DiL RU" or "P2P RU" refers to a resource unit so allocated for Direct Link transmission.

FIGS. 2*c* and 2*d* illustrate such trigger-based (TB) P2P transmission during a transmission opportunity (TXOP) 241. In this example, the P2P transmission 221 is triggered by a triggering frame 211 that may be a trigger frame or a control or data frame containing a TRS subfield. It is assumed that the P2P transmission occupies the overall operating frequency band, e.g. 20 MHz as shown in the example, however other frequency bands, such as 40 MHz, 80 MHz, 80+80 MHz and 160 MHz may be envisioned.

Although one DiL RU 261 is depicted in the Figure, more DiL RUs may be provided by the same triggering frame 211 to various P2P stations. Preferably, each DiL RU is made of one or more 20 MHz channels as defined in 802.11.

Triggering frame 211 conveys the signaling of such DiL RU or RUs. For instance, one bit may be used to signal an RU over the overall operating frequency band as being dedicated to DiL.

AP 110 transmits triggering frame 211 on the overall operating frequency band, i.e. 20 MHz in this example, based on the nominal transmit center frequency of its internal reference clock. As specify in the 802.11ax standard, the tolerance on this nominal transmit center frequency is ±20 ppm in the 5 GHz and 6 GHz bands.

Then, upon receiving triggering frame 211 from AP 110, P2P STA1 is able to determine whether it is allocated a DiL RU, and in the affirmative which resource unit.

P2P STA1 uses a first part of the allocated DiL RU 261 to transmit a physical protocol data unit (P2P PPDU) 221 to P2P STA2. Then, P2P STA2 uses a second part over time of the DiL RU 261 to transmit a response frame 231, such as an acknowledgment (ACK) frame. Usually, P2P STA1 determines the first part based on the whole TXOP by letting enough time (second part) for the acknowledgment, the size of which is known.

P2P STA1 can transmit its P2P PPDU frame 221 at its nominal transmit center frequency (the preamble is centered within and spanned overall the 20 MHz channel while the data are spanned over the tones of the DiL RU). Indeed, as there is no simultaneous transmission, there is no need of seeking orthogonality with another transmission.

The tolerance on its transmit center frequency is usually ±20 ppm (5 GHz or 6 Ghz bands used).

P2P STA2 transmits its response frame 231, for example an ACK frame, based on the nominal transmit center frequency of its internal clock, as for P2P STA1. The tolerance on its transmit center frequency is also ±20 ppm (5 GHz or 6 Ghz bands used).

In order to improve spectrum efficiency, latency and overall useful data throughput even more further, one may consider combining MU UL and DiL RUs during the same MU transmission. In other words, it is now considered having MU transmissions as represented in FIGS. 2*a*, 2*b* together with P2P transmissions as represented in FIGS. 2*c*, 2*d* that are triggered simultaneously by the same AP using the same triggering frame.

Preferably, the UL transmission and the P2P transmission occur on two or more adjacent 20 MHz channels. Preferably, the P2P transmissions occupy one or more entire 20 MHz channels.

In other words, a triggering frame reserving a transmission opportunity, TXOP, is sent by an AP. The triggering frame allocates one (or more) DiL RU to a first P2P STA for DiL communication (with a second P2P STA) and allocates one or more uplink, UL, RUs for UL communication during a specified UL duration. Preferably, the one or more UL RUs belongs to a set of RUs defined, in the triggering frame, to be adjacent, in frequency, to the DiL RU. Usually, the triggering frame is duplicated over each 20 MHz channel forming the operating frequency band.

During the specified UL duration, triggered non-AP stations transmit HE TB PPDUs over the UL RUs of a first 20 MHz channel while the first P2P STA transmits P2P PPDUs over the DiL RU of a frequency-adjacent 20 MHz channel.

However, such simultaneous MU UL and P2P transmissions from multiple (e.g. non-AP) stations on frequency-adjacent channels face some interference issues, in particular with respect to the orthogonality of the signals simultaneously transmitted by the multiple stations.

Indeed, even if adjacent 20 MHz (or more) channels are spaced by some guard tones, they can be affected by Adjacent Channel Interference (ACI). The ACI happens when there is a lack of orthogonality between the communications occurring over the frequency-adjacent channels. The ACI level mainly depends on the distance between stations, the transmission power, the antenna patterns and the accuracy in time and frequency of the transmitters involved on the adjacent channels.

A main reason of a lack of orthogonality is due to the difference between the nominal transmit center frequencies of the various transmitting stations within the wireless communication network. As mentioned earlier, the 802.11ax standard, draft version 7.0 (D7.0) of November 2020, specifies a tolerance of ±20 ppm in the 5 GHz and 6 GHz bands for the symbol clock frequency and the transmit center frequency to be used by the transmitting stations (except for the transmission of HE TB PPDU format which is subject to additional requirements). As an example, in the 5 GHz band, this results in a frequency uncertainty of ±120 kHz for a given transmitting station. In view of the subcarrier spacing of 78.125 kHz defined in the 802.11ax standard, this uncertainty is not negligible.

Carefulness is thus required when combining MU UL and P2P transmissions. In particular, the second P2P station, P2P STA2 in the example above, which may even not be associated with the AP, is far from being synchronized with the AP. However, P2P STA2 may naturally be involved in P2P transmissions simultaneous to the AP.

Based on the examples above, let assume STA3 and STA4 transmit HE TB PPDU frames 220 over two UL RUs 260 and 270 of a first 20 MHz channel and STA1 transmits P2P PPDU frame 221 over a second 20 MHz channel adjacent in frequency to the first 20 MHz channel at its nominal transmit center frequency. The transmitted frames 220 and 221 may then interfere one with each other. This is because they are not orthogonal due to the use respectively of a pre-corrected transmit center frequency within a ±350 Hz window from the AP's nominal transmit center frequency for STA3 and STA4, and of its nominal transmit center frequency for STA1 with a tolerance of ±20 ppm (5 GHz or 6 GHz band used).

Furthermore, once the MU UL length 250 ends, AP 110 transmits multi-station block ack frame 230 over the whole first 20 MHz channel while STA2 transmits Ack frame 231 over the second 20 MHz channel adjacent to the first 20 MHz channel. Again, the transmitted ack frames 230 and 231 will surely interfere one with each other. This is again because they are not orthogonal due to the use of different nominal transmit center frequencies: the nominal transmit center frequency of AP 110 and the nominal transmit center frequency of STA2 which may have a maximum deviation of 40 ppm (5 GHz or 6 GHz band used).

In the current state of 802.11 be developments, the orthogonality of simultaneous MU UL and P2P transmissions triggered by the same triggering frame cannot be guaranteed. Hence, the efficiency of the wireless network is substantially degraded.

It is thus an object of the present invention to provide, under AP's scheduling, simultaneous MU UL and P2P communication schemes reducing, or even avoiding, interference issues over frequency-adjacent channels between transmitting stations, in particular with respect to the acknowledgment frames.

In this context, the present invention contemplates a new scenario for the P2P exchange between the first and second P2P stations. During the specified UL duration when the UL transmission occurs, the first P2P STA transmits, to the second P2P STA, a first P2P frame over a first part of the allocated DiL RU and receives a second P2P frame, for instance an acknowledgment frame, from the second P2P STA over a second part of the DiL RU.

Therefore, the P2P transmission (first P2P frame) and its acknowledgment (or response—second P2P frame) are both nested in the UL duration, i.e. both occur during the MU UL transmission. Interferences with the block ack frame of the AP to acknowledge the UL transmissions is thus fully avoided.

Figures 4A, 4B:
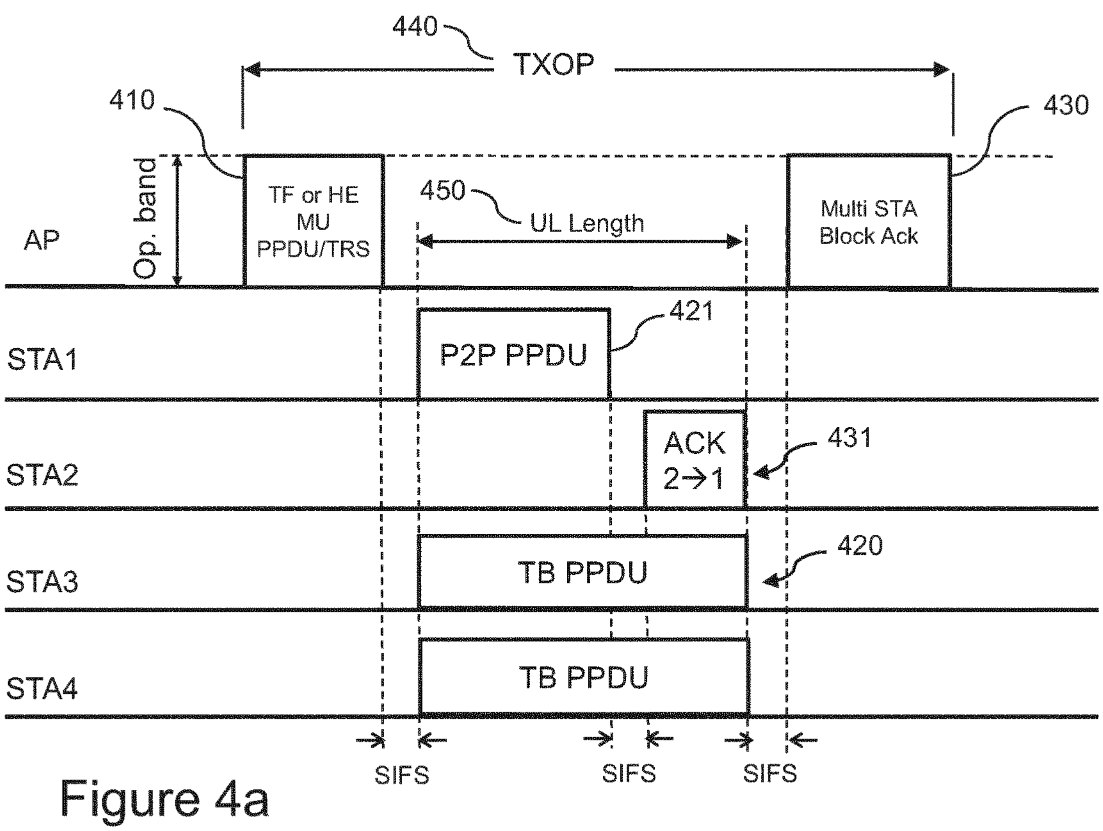
FIG. 4a illustrates, from stations perspective, simultaneous trigger-based (TB) P2P and MU UL OFDMA transmissions during a transmission opportunity (TXOP) according to a first set of embodiments of the invention.
FIG. 4b illustrates the same transmissions as depicted in FIG. 4a, but from the operating frequency band perspective.
Figure 5A:
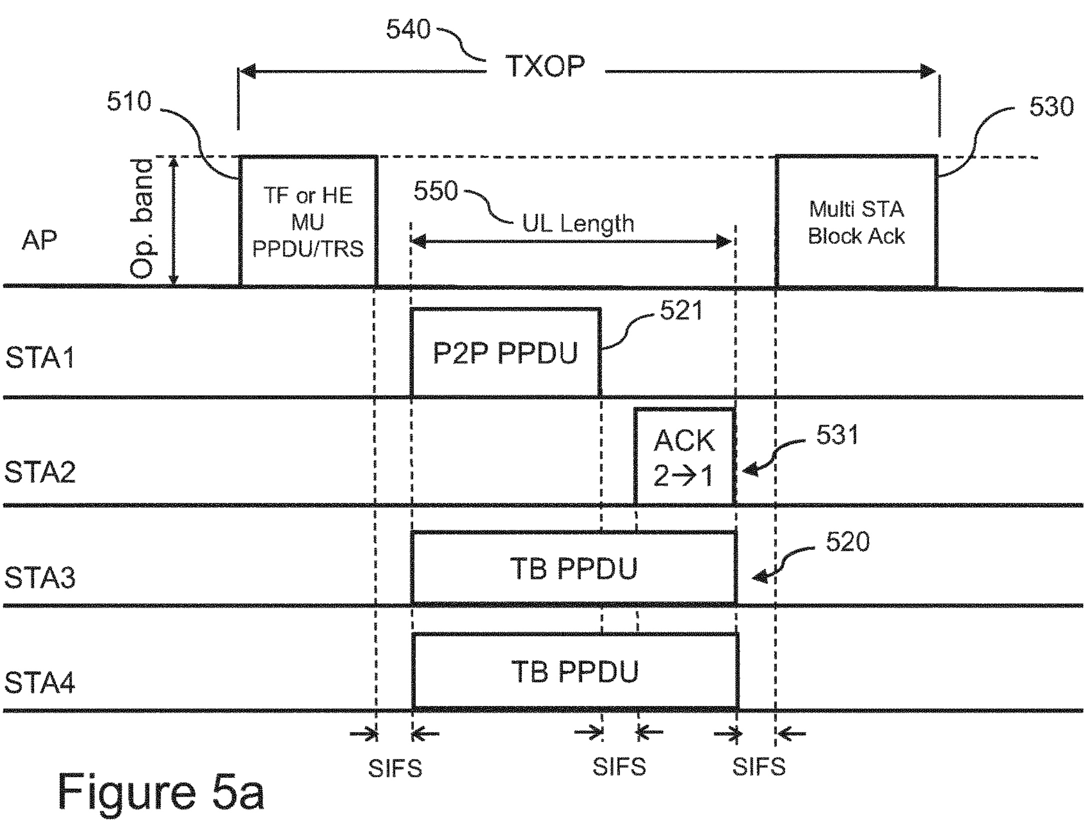
FIG. 5a illustrates, from stations perspective, simultaneous trigger-based (TB) P2P and MU UL OFDMA transmissions during a transmission opportunity (TXOP) according to a second set of embodiments of the invention.
Figure 5B:
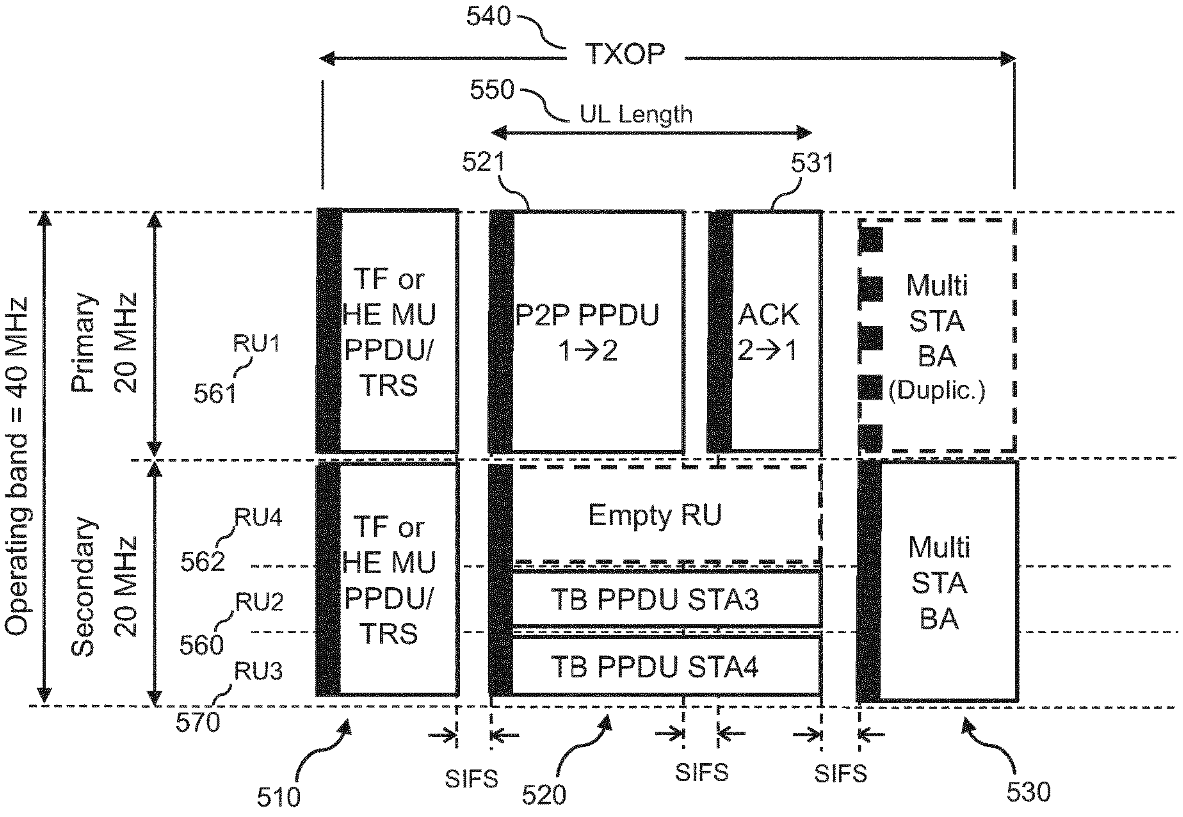
FIG. 5b illustrates the same transmissions as depicted in FIG. 5a, but from the operating frequency band perspective.

Various embodiments are now described with respect to FIGS. 4*a* and 4*b* (first set of embodiments) and FIGS. 5*a* and 5*b* (second set of embodiments)

Those embodiments distinguish one from the other in that, in the set of embodiments of FIGS. 5*a* and 5*b*, one RUs that is immediately adjacent in frequency to the DiL RU may be defined in the triggering frame to remain empty during the UL duration, while there is no such empty RU in the embodiments of FIGS. 4*a* and 4*b*.

Of course, the choice between both scenarios can be made by the AP itself, based on some criteria as explained below.

FIGS. 6, 7 and 7*a* illustrate corresponding general steps performed respectively by the AP, a non-AP station (including a transmitting P2P station) and a receiving P2P station, to implement embodiments of the invention.

FIGS. 4*a* and 4*b* illustrate, respectively from stations and operating frequency band perspective, simultaneous trigger-based (TB) MU UL and P2P transmissions over frequency-adjacent channels forming the operating frequency band.

In the example shown, the TB P2P transmission is performed on a first 20 MHz channel forming the primary channel of the operative band and the TB MU UL OFDMA transmissions are performed over another, secondary, 20 MHz channel adjacent to the first 20 MHz channel during a transmission opportunity (TXOP) 440 reserved by a triggering frame 410.

This example of primary and secondary channels mapping for the TB P2P transmission and the TB MU UL OFDMA transmission is not limitative and other primary and secondary channels mapping could be used based on the same channel width of 20 MHz or based on higher channel widths such as 40 MHz, 80 MHz or 160 MHz: the TB P2P transmission may be performed on one or more 20 MHz channels, be them primary or secondary, while the TB MU UL OFDMA transmission may be performed on one or more 20 MHz channels, be them primary or secondary.

As apparent from FIGS. 4*a* and 4*b*, the length of the overall P2P transmission, including the P2P PPDU frame 421 from P2P STA1 to P2P STA2 and the corresponding Ack frame 431 from P2P STA2 to P2P STA1 is shortened to match the length of the MU UL OFDMA transmission 450 (for HE TB PPDU frames 420 to AP 110 over UL RUs 460 and 470) as specified in triggering frame 410, for instance through UL Length field 332.

The triggering frame 410 may be a trigger frame as defined in 802.11ax or a data or control frame with a TRS subfield as introduced above.

The transmission of Ack frame 431 is thus shifted in time, compared to FIGS. 2*c* and 2*d* where it is made at the end of the TXOP, to avoid parallel transmission of the Ack frames for P2P and MU UL transmissions (frames 431 and 430). Therefore, after reception of the HE TB PPDU frames 420 from STA3 and STA4, AP 110 transmits multi-station block Ack frame 430 towards STA3 and STA4 over the secondary 20 MHz channel (formed by the UL RUs).

In some embodiments, multi-station block Ack (BA) frame 430 is sent over only the 20 MHz channel or channels carrying the UL RUs defined in triggering frame 410.

In a variant, BA frame 430 is sent over the operating frequency band reserved by triggering frame 410, i.e. a band also including the 20 MHz channel or channels formed by the DiL RU or RUs: a BA frame 430 may be duplicated over each 20 MHz channel (see the dotted BA frame in FIG. 4*b*) or a single BA frame spread over the whole operating frequency band (40 MHz in the example) may be transmitted. This artificial channel occupancy aims at protecting the 20 MHz channel or channels of the DiL RU or RUs from medium access by stations having not their NAV set.

In another variant, any station in the network may be configured to send energy over the 20 MHz channel of the DiL RU until the end of the TXOP, with the same result of protecting it. In particular, the station may be the first P2P station (P2P STA1) for instance after having received the Ack frame 431. To avoid ACI during this transmission, the station may preferably avoid transmitting energy over the tones adjacent in frequency to the 20 MHz channel of the BA frame 430: the energy may thus be transmitted over the 20 MHz channel of the DiL RU except guard tones adjacent in frequency to the 20 MHz channel where other RUs are defined by the triggering frame, here the adjacent UL RUs.

In more details of the embodiments, P2P STA1 and STA2 have established a direct link session prior to the simultaneous trigger-based (TB) MU UL and P2P transmissions sequence. DiL needs have been declared by P2P STA1 to AP 110 in order to be granted DiL RUs. It is recalled that P2P STA2 may be known or not to AP 110 (i.e. registered to AP 110 or not, in its transmission range or not).

Similarly, STA3 and STA4 have some data to transmit to AP 110 and have declared their needs in UL RUs to AP 110.

At step 600 (FIG. 6), AP 110 determines a scenario of transmission given the needs declared by the stations. It may then decide to initiate a sequence of simultaneous TB MU UL and P2P transmissions for STA3, STA4 and STA1.

To do so, AP 110 creates, at step 610, a triggering frame 410 indicating STA1 as the recipient of a DiL RU 461 spanning the whole band of a primary 20 MHz channel and indicating STA3 and STA4 as the allocated stations of, respectively, an UL RU 460 and an UL RU 470 splitting the whole band of the adjacent secondary 20 MHz channel. Of course, there may be another number of UL RUs, i.e. less such as a single one, but also more, such as three, four or more allocated to respective stations.

Also, as mentioned above, wider channels may be considered for instance to provide more DiL RUs and/or more UL RUs to non-AP stations.

Signaling of the UL RUs is performed in a conventional manner, as described above with respect to FIGS. 2*a* and 2*b*.

The DiL RU may be signaled in the associated "User Info" field 340 (i.e. the field corresponding to the offered RU) by using an appropriate value in the "AID12" subfield 341.

In one implementation, the "AID12" subfield 341 may convey a DiL session identifier corresponding to the direct link session between P2P STA1 and P2P STA2. This can be envisaged when the AP has allowed the P2P session (like for DLS protocol if within its BSS) or alternatively is aware of P2P protocol (outside its BSS and discovered through beacon frames or discovery frames of the coordinated scheme) and has granted an identifier to the session. Preferably, the DiL session identifier is constrained to the AID format of 12 bits; it is then up to the AP to allocate values distinct from those AIDs identifying individual non-AP stations.

Alternatively, the "AID12" subfield 341 may convey an AID of P2P STA1. In variants, the two AIDs (if any) of P2P STA1 and P2P STA2 can be indicated in the "User Info" field (using for instance the "AID12" subfield 341 and/or the "Trigger Dependent User Info" section 344).

The DiL RU may also be signaled using a single bit in the associated "User Info" field 340. For instance, reserved bit 343 may be set to 1 when the corresponding RU is declared as DiL RU. Of course, any other available bit may be used (including any bit in the "Trigger Dependent User Info" section 344)

A single bit may also be used in the case of the "TRS" subfield 350, for instance reserved bit 354.

Still at step 610, AP 110 transmits triggering frame 410 over the overall operating frequency band which includes, in this example, both primary and secondary 20 MHz channels. Preferably, triggering frame 410 is duplicated over each 20 MHz channel. The transmission by AP 110 is made at its nominal transmit center frequency.

Upon receiving triggering frame 410 (step 700—FIG. 7), the non-AP stations (STA1, STA3, STA4) determines whether they are allocated an RU (step 705). This is made by parsing and reading the "User Info" fields 340 of triggering frame 410 for instance.

In the negative, the station is not involved in the forthcoming MU scheme and the process ends.

In the affirmative, they decode triggering frame 410 (using for instance the nominal transmit center frequency used by AP 110 and inferred through a carrier frequency offset and timing compensation based on the starting portion (FIG. 3*c*) of the preamble of triggering frame 410) and then determine whether the allocated RU is for DiL or UL purpose (step 710). This is made by retrieving the above signaling (for instance specific values in the AID12 field 341, or enable value in bit 343 or 354).

In case of UL RU, conventional processing (described above with respect to FIGS. 2*a* and 2*b*) is performed. In particular, STA3 and STA4 prepare their MU TB PPDUs 420 and transmit them over their respective allocated UL RUs a SIFS after triggering frame 410. The transmission lasts the entire UL Length 450 (described below) specified by AP 110 in triggering frame 410. STA3 and STA4 perform a carrier frequency offset and timing compensation as described above, with respect to triggering frame 410: in particular they transmit HE TB PPDUs 420 with a pre-corrected transmit center frequency within a ±350 Hz window from the nominal transmit center frequency used by AP 110 (i.e. center of the 20 MHz channel concerned). As the UL RUs 460, 470 split the 20 MHz channel, the HE TB PPDUs have the same preamble transmitted over the entire 20 MHz channel at the pre-corrected transmit center frequency of the 20 MHz channel and their respective data transmitted over the respective UL RUs 460, 470 (given the subcarrier spacing of their tones).

In case of DiL RU (for P2P STA1), P2P STA1 retrieves the length 450 of the MU UL transmission. This UL duration allocated by AP 110 is referenced TXTIME0. This is step 715.

In case of a trigger frame, TXTIME0 450 is retrieved from UL Length field 332. For instance:

$$TXTIME0 = \frac{\text{UL\_LENGTH}}{3} * 4 + 24$$

In case of a frame with a TRS subfield 350, it is inferred from UL Data Symbol subfield 351 (indicating the number of OFDM symbols of the Data portion of the HE TB PPDU) and UL HE MCS subfield 353.

As these various fields and subfields are now dedicated for both MU UL and DiL, they can be renamed to TB Length, TB Data Symbols and TB HE-MCS respectively. Existing names, UL Length, UL Data Symbols and UL HE-MCS, are however still used in the following description.

Next, as both P2P frame 421 and P2P Ack frame 431 have to be nested within UL Length 450, P2P STA1 determines a new transmission time TXTIME1 dedicated for the transmission of the first P2P frame, namely P2P frame 421. This is because the size (TXTIME2) of the second P2P frame, Ack frame 431, may be known (as being an acknowledgment).

Hence, at step 720, TXTIME2 and a SIFS duration are subtracted to TXTIME0:

$$TXTIME1 = TXTIME0 - TXTIME2 - SIFS.$$

This is because the first part (for the first P2P frame) and the second part (for the second P2P frame) are time-multiplexed and separated by a short interframe space, SIFS.

At step 725, P2P STA1 determines P2P transmission parameters. For instance, P2P STA1 determines the optimum MCS value to transmit data to P2P STA2 based for example on the SNR measured during a latest past transmission received from P2P STA2. This determined MCS value or a predefined default MCS value can be used by P2P STA2 for the transmission of Ack frame 431 to P2P STA1. The determined MCS value and TXTIME1 allow the quantity of data that can be sent by P2P STA1 to P2P STA2 to be computed.

P2P STA1 then creates (step 730) P2P PPDU 421 given the quantity of data it can send. It then transmits it on the first part of DiL RU 461 allocated by AP 110. The first part corresponds to the starting TXTIME1 of DiL RU 461.

To avoid channel interference with simultaneous UL transmissions by STA3 and ST4, P2P STA1 performs a carrier frequency offset and timing compensation as described above, with respect to triggering frame 410: in particular it transmits P2P PPDU 421 with a pre-corrected transmit center frequency within a ±350 Hz window from the nominal transmit center frequency used by AP 110 (i.e. center of the 20 MHz channel) to transmit triggering frame 410.

P2P STA1 transmits its P2P PPDU frame 421 using the same rules (compensations) as specified in the 802.11ax standard for the transmission of a HE TB PPDU frame. For instance, the transmission also starts within a SIFS±0.4 μs period from the end of triggering frame 410.

As the DiL RU 461 is spread over the whole 20 MHz channel, the P2P preamble and the P2P data of P2P PPDU 421 are 20 MHz-wide.

Upon receiving and decoding P2P PPDU 421 on DiL RU 461 (step 750—FIG. 7*a*), P2P STA2 creates an acknowledgment frame 431 and transmits it, a SIFS duration after the end of P2P PPDU 421 (step 755). This transmission occurs on a second part of DiL RU 461, the last TXTIME2 of the RU. Indeed, the transmitting of the first P2P frame 421 has been configured such that an end of transmission of the second P2P frame 431 by P2P STA2 aligns in time with an end of the specified UL duration 450.

P2P STA2 transmits Ack frame 431 at its nominal transmit center frequency. The tolerance on its transmit center frequency is ±20 ppm (5 GHz or 6 Ghz bands used).

P2P STA1 thus receives Ack frame 431 at step 735 and decodes it.

During UL Length 450, AP 110 receives HE TB PPDUs 420 from STA3 and STA4 and decode them (step 620).

A SIFS duration after the end of the HE TB PPDU transmissions 420, AP 110 takes the medium again and sends a MU DL frame to stations, for instance multi-station block Ack frame 430 to acknowledge all the HE TB PPDUs received (step 630).

As mentioned above, in some embodiments, AP 110 transmits, after the specified UL duration 450 (e.g. a SIFS after), an acknowledgement, ACK, frame over a frequency band that encompasses the DiL RU, for instance by duplicating BA frame 430 on each 20 MHz channel of the operating frequency band.

Turning now to FIGS. 5*a* and 5*b* (respectively from stations and operating frequency band perspective), another scenario of simultaneous trigger-based (TB) MU UL and P2P transmissions over frequency-adjacent channels forming the operating frequency band is described according to the second set of embodiments.

These embodiments distinguish from the previous ones in that one RUs that is immediately adjacent in frequency to the DiL RU 561 is defined in the triggering frame to remain empty during the UL duration 550.

As shown in the Figures, the immediately frequency-adjacent RU is at a boundary of a 20 MHz channel adjacent in frequency to another 20 MHz channel to which the DiL RU belongs.

The description above with reference to FIGS. 4*a*, 4*b*, 6, 7 and 7*a* still apply for the second set of embodiments, given the precisions provided below. Examples of above description that still apply include the P2P transmission part between P2P STA1 and P2P STA2, the multi-station block Ack transmission part from AP 110 to STA3 and STA4, channels that may be wider than 20 MHz, BA frame 530 that may or may not be duplicated over the DiL-dedicated 20 MHz channel or channels, energy that may be emitted over the DiL-dedicated 20 MHz channel by a station in variants.

The embodiments of the second set advantageously reduce, and even avoid, channel interference between P2P Ack frame 531 by P2P STA2 and HE TB PPDUs 520 from STA3 and STA4 during the UL Length 550.

Next to step 600 described above, AP 110 creates (step 610) triggering frame 510 with a "guard" or "empty" RU 562 in the 20 MHz channel dedicated to UL RUs 560, 570 and adjacent in frequency to DiL RU 561. This additional RU 562 is the closest RU in frequency to the primary 20 MHz channel (dedicated to DiL) and is intentionally not used during MU UL data transmission. In other words, "guard" or "empty" means that the RU immediately adjacent in frequency to the DiL RU cannot be used by any station: no signal or energy must be conveyed over this RU.

To make the protection against channel interference efficient, "guard" or "empty" RU 562 is at least 26-tones width, preferably 52-tones width or more.

A third RU 562 is thus defined, hence narrowing UL RUs 560 and 570. However, the present invention applies to any number of RUs in the 20 MHz channel considered, from a single one (thus the "empty" or "guard" RU alone), two RUs (one empty RU and one UL RU assigned/allocated to STA3 for instance) to a plurality thereof.

Where two DiL-dedicated 20 MHz channels are defined on both sides of an UL-dedicated 20 MHz channel, two "empty" or "guard" RU may be defined at both boundaries of the UL-dedicated 20 MHz channel with the DiL-dedicated 20 MHz channels.

The addition of a "guard" or "empty" RU may be systematic by AP 110, i.e. each time a DiL RU is defined in triggering frame 510.

In other embodiments, AP 110 may decide the addition (or not) based on some criteria. For instance, AP 110 may obtain, from P2P STA1 (e.g. when it declares its DiL needs), an acknowledgment policy relating to the DiL communication. Indeed, when declaring its DiL needs to AP 110, P2P STA1 may indicate whether an acknowledgment frame 531 from P2P STA2 is required or not. Therefore, where no Ack frame 531 is expected, there is no risk of interference between it and simultaneous HE TB PPDUs. In such a case, AP 110 may decide, based on the obtained acknowledgment policy, whether to define the RU immediately adjacent to the DiL RU to remain or not empty during the UL duration. With a policy without ack frame, no "guard" or "empty" RU is necessary and defined. With a policy requiring an ack frame, a "guard" or "empty" RU is necessary and thus defined in triggering frame 510. Of course, other criteria than the acknowledgement policy may be used alone or in combination.

The allocation of "guard" or "empty" RU 562 may be managed in different ways by AP 110 in triggering frame 510.

In one embodiment, AP 110 does not allocate RU 562 to any station. No identifier (null identifier) may be set in the "AID12" subfield 341 of the corresponding "User Info" field 340 (i.e. associated with the "guard" or "empty" RU 562 identified in "RU Allocation" subfield 342).

This may also be done implicitly by defining UL RUs 560 and 570 so that some tones in the 20 MHz channel remain not allocated any station and thus form a guard RU.

In another embodiment, AP 110 specifies an unknown station's AID in the "AID12" subfield 341 of the corresponding "User Info" field 340.

In yet other embodiment, AP 110 specifies a predefined reserved AID (e.g. 2046 or any other reserved value in the 802.11ax standard) in the "AID12" subfield 341 of the corresponding "User Info" field 340.

Once triggering frame 510 is ready, it is transmitted by AP 110 as described above, based on its nominal transmit center frequency. Other steps (620, 630 and those of FIGS. 7 and 7*a*) are then performed.

The examples of FIGS. 4 to 7 consider a DiL scenario where P2P STA1 sends a first P2P frame and P2P STA2 responds with an Ack frame, all nested within the UL Length duration specified by AP 110 within TXOP. Other scenarios may be contemplated, for instance, P2P STA1 that sends successive P2P PPDUs during the UL Length duration and P2P STA2 that at the end (still within the UL Length duration) transmits a BA frame. In another example, the UL Length duration may be used by P2P STA1 and STA2 to perform successive sequences of P2P frame and corresponding Ack frame, the last one ending with the UL Length duration.

Preferably P2P STA1 and STA2 are 802.11 be stations. However, as P2P STA2 does not interact with AP 110, it may be a legacy station, i.e. a station not compliant with 802.11 be, for instance an 802.11ax station or even a station compliant with earlier 802.11 standards.

Figures 8A, 8B:
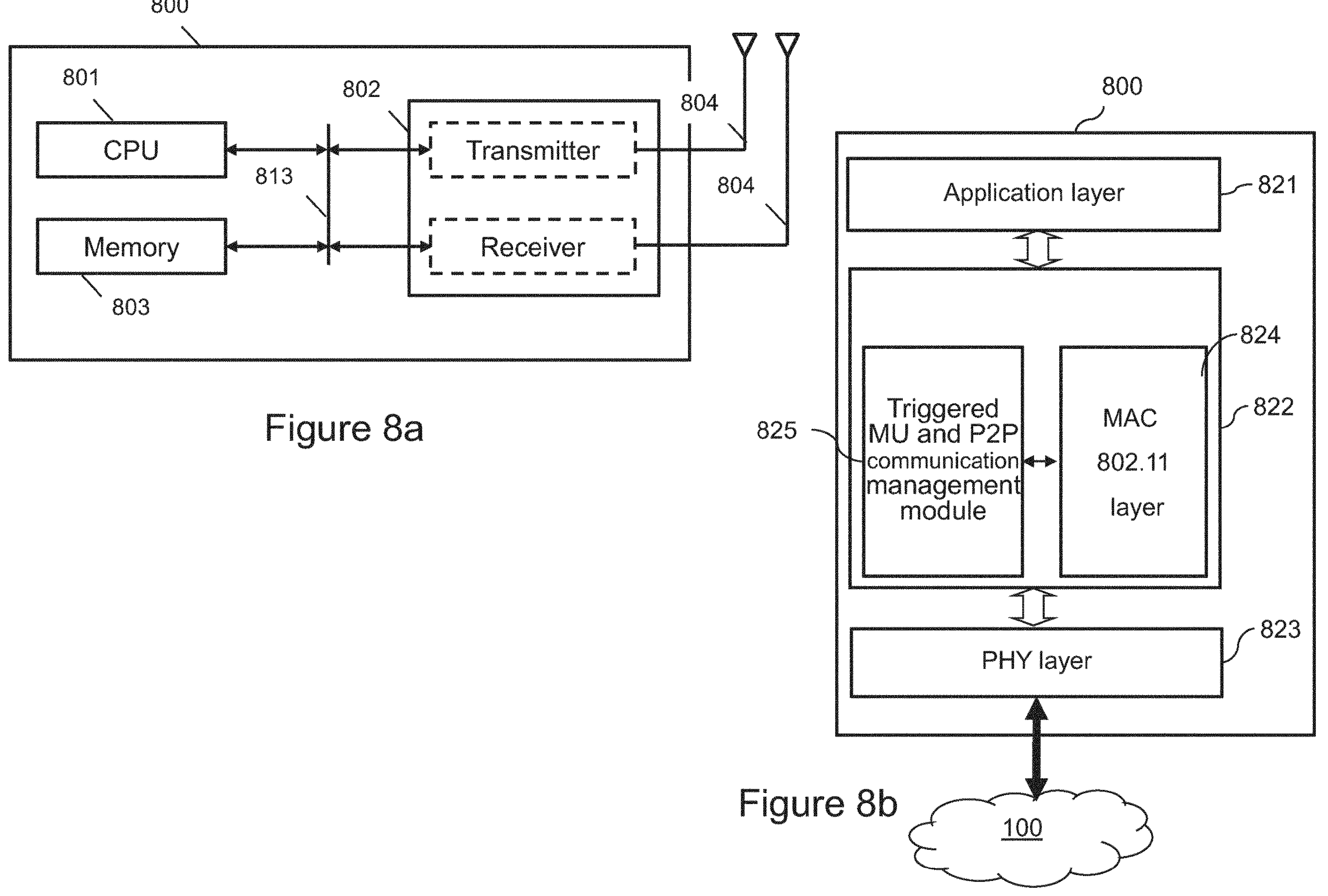
FIG. 8a shows a schematic representation a communication device in accordance with embodiments of the present invention.
FIG. 8b shows a schematic representation of a wireless communication device in accordance with embodiments of the present invention.

FIG. 8*a* schematically illustrates a communication device 800, either a non-AP station 101-107 or the access point 110, of the radio network 100, configured to implement at least one embodiment of the present invention. The communication device 800 may preferably be a device such as a micro-computer, a workstation or a light portable device. The communication device 800 comprises a communication bus 813 to which there are preferably connected:

- a central processing unit 801, such as a processor, denoted CPU;
- a memory 803 for storing an executable code of methods or steps of the methods according to embodiments of the invention as well as the registers adapted to record variables and parameters necessary for implementing the methods; and
- at least one communication interface 802 connected to a wireless communication network, for example a communication network according to one of the IEEE 802.11 family of standards, via transmitting and receiving antennas 804.

Preferably the communication bus provides communication and interoperability between the various elements included in the communication device 800 or connected to it. The representation of the bus is not limiting and in particular the central processing unit is operable to communicate instructions to any element of the communication device 800 directly or by means of another element of the communication device 800.

The executable code may be stored in a memory that may either be read only, a hard disk or on a removable digital medium such as for example a disk. According to an optional variant, the executable code of the programs can be received by means of the communication network, via the interface 802, in order to be stored in the memory of the communication device 800 before being executed.

In an embodiment, the device is a programmable apparatus which uses software to implement embodiments of the invention. However, alternatively, embodiments of the present invention may be implemented, totally or in partially, in hardware (for example, in the form of an Application Specific Integrated Circuit or ASIC).

FIG. 8*b* is a block diagram schematically illustrating the architecture of the communication device 800, either AP 110 or one of stations 101-107, adapted to carry out, at least partially, the invention. As illustrated, device 800 comprises a physical (PHY) layer block 823, a MAC layer block 822, and an application layer block 821.

The PHY layer block 823 (here an 802.11 standardized PHY layer) has the task of formatting, modulating on or demodulating from any 20 MHz channel or the composite channel, and thus sending or receiving frames over the radio medium used 100, such as 802.11 frames, for instance medium access trigger frames TF 210 (FIG. 2*a*) to reserve a transmission slot, MAC data and management frames based on a 20 MHz width to interact with legacy 802.11 stations, as well as of MAC data frames of OFDMA type having smaller width than 20 MHz legacy (typically 2 or 5 MHz) to/from that radio medium.

The MAC layer block or controller 822 preferably comprises an 802.11 MAC layer 824 implementing conventional 802.11ax MAC operations, and additional block 825 for carrying out, at least partially, the invention. The MAC layer block 822 may optionally be implemented in software, which software is executed by CPU 801.

Preferably, the additional block 825, referred to as Triggered MU and P2P communication management module for handling simultaneous triggered MU and P2P transmissions over adjacent channels following a medium access triggering frame, implements the part of embodiments of the invention (either from station perspective or from AP perspective).

802.11 MAC layer 824, Triggered MU and P2P communication management module 825 interact one with the other in order to process accurately communications over OFDMA RU addressed to multiple stations according to embodiments of the invention.

On top of the Figure, application layer block 821 runs an application that generates and receives data packets, for example data packets such as a video stream. Application layer block 821 represents all the stack layers above MAC layer according to ISO standardization.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A communication method in a wireless network comprising, at a first peer-to-peer (P2P) station (STA):

- receiving, from an access point (AP) a triggering frame reserving a transmission opportunity (TXOP), the triggering frame allocating one direct link (DiL) resource unit (RU) to the first P2P STA for DiL communication and allocating one or more uplink (UL) RUS for UL communication during a specified UL duration, and
- during the specified UL duration, transmitting, to a second P2P STA, a first frame over a first part of the allocated DiL RU; and
- receiving a second frame from the second P2P STA over a second part of the DiL RU, wherein the first part and the second part are time-multiplexed and separated by a short interframe space, SIFS, and wherein the transmitting of the first frame is configured such that an end of transmission of the second frame by the second P2P STA aligns in time with an end of the specified UL duration.

2. The method of claim 1, wherein one RU that is immediately adjacent in frequency to the DiL RU is defined in the triggering frame to remain empty during the UL duration.

3. The method of claim 1, further comprising, at the first P2P STA, sensing an acknowledgment, ACK, frame sent by the AP on the DiL RU, after the specified UL duration and, in case no ACK frame is sensed, transmitting energy over the DiL RU for a time remaining after the UL duration given the TXOP.

4. The method of claim 1, further comprising setting the length of the first frame by:

- calculating a time TXTIME1 available for the first P2P STA to transmit a physical protocol data unit (PPDU) comprising the first frame based on a time of transmitting the second frame; and
- deriving a data length of the first frame based on the obtained time TXTIME1 and at least one transmission parameter, such as a modulation and coding scheme (MCS) used for transmitting the first frame, wherein TXTIME1 is calculated as TXTIME0-TXTIME2-SIFS, where:

TXTIME0 is computed from the UL duration specified in the triggering frame, and

TXTIME2 is the time required to the second P2P STA to transmit a physical protocol data unit (PPDU) comprising the second frame.

5. The method of claim 1, wherein the second frame is a response frame to the first frame, preferably an acknowledgement (ACK) frame sent by the second P2P STA for acknowledging reception of the first frame.

6. The method of claim 1, wherein the one or more UL RUs belongs to a set of RUs defined, in the triggering frame, to be adjacent, in frequency, to the DiL RU.

7. The method of claim 1, wherein the allocated DiL RU is an n*20 MHz channel, with n a positive integer.

8. The method of claim 1, wherein the triggering frame is a trigger frame received from the AP or a data or control frame received from the AP that includes a trigger resource scheduling (TRS) field.

9. A communication device in a wireless network, capable of operating as a first peer-to-peer (P2P) station (STA), the communication device comprising:

one or more processors; and one or more memories storing instructions that, when executed by the one or more processors, cause the communication device to:

receive, from an access point (AP), a triggering frame reserving a transmission opportunity (TXOP), the triggering frame allocating one direct link (DiL) resource unit (RU) to the first P2P STA for DiL communication and allocating one or more uplink (UL) RUs for UL communication during a specified UL duration;

during the specified UL duration, transmit, to a second P2P STA, a first frame over a first part of the allocated DiL RU; and receive a second frame from the second P2P STA over a second part of the DiL RU, wherein the first part and the second part are time-multiplexed and separated by a short interframe space, SIFS, and wherein the transmitting of the first frame is configured such that an end of transmission of the second frame by the second P2P STA aligns in time with an end of the specified UL duration.

* * * * *